United States Patent
Wells et al.

(10) Patent No.: US 12,502,234 B2
(45) Date of Patent: Dec. 23, 2025

(54) SURGICAL ROBOTIC SYSTEM FOR CONTROLLING WRISTED INSTRUMENTS

(71) Applicant: Covidien LP, Mansfield, MA (US)

(72) Inventors: Brian K. Wells, Killingworth, CT (US); Brian A. Rockrohr, Guilford, CT (US); Alok Agrawal, New Haven, CT (US)

(73) Assignee: Covidien LP, Mansfield, MA (US)

( * ) Notice: Subject to any disclaimer, the term of this patent is extended or adjusted under 35 U.S.C. 154(b) by 354 days.

(21) Appl. No.: 18/022,284

(22) PCT Filed: Aug. 31, 2021

(86) PCT No.: PCT/US2021/048416
§ 371 (c)(1),
(2) Date: Feb. 21, 2023

(87) PCT Pub. No.: WO2022/060565
PCT Pub. Date: Mar. 24, 2022

(65) Prior Publication Data
US 2023/0320795 A1 Oct. 12, 2023

Related U.S. Application Data

(60) Provisional application No. 63/114,616, filed on Nov. 17, 2020, provisional application No. 63/078,495, filed on Sep. 15, 2020.

(51) Int. Cl.
*A61B 34/30* (2016.01)
*A61B 34/00* (2016.01)
*A61B 90/00* (2016.01)

(52) U.S. Cl.
CPC ............. *A61B 34/30* (2016.02); *A61B 34/71* (2016.02); *A61B 90/06* (2016.02); *A61B 2034/305* (2016.02); *A61B 2090/066* (2016.02)

(58) Field of Classification Search
CPC ......... A61B 34/30; A61B 34/71; A61B 90/06; A61B 2034/305; A61B 2090/066; A61B 2090/064
See application file for complete search history.

(56) References Cited

U.S. PATENT DOCUMENTS 4,688,555 A * 8/1987 Wardle ............... A61B 1/00042
600/149
5,797,900 A * 8/1998 Madhani ................ A61B 34/30
606/1

(Continued)

FOREIGN PATENT DOCUMENTS

WO 2019221754 A1 11/2019
WO 2020118149 A1 6/2020

OTHER PUBLICATIONS

International Search Report and Written Opinion of the International Searching Authority issued in corresponding application PCT/US2021/048416 mailed Feb. 4, 2022 (17 pages).

*Primary Examiner* — Bhavesh V Amin
(74) *Attorney, Agent, or Firm* — Carter, DeLuca & Farrel

(57) ABSTRACT

A surgical robotic arm includes an instrument having a plurality of cables that are movable longitudinally and an end effector movable by the cables. The surgical robotic arm also includes a drive unit having a plurality of motors each of which is configured to move one of the cables and a plurality of torque sensors, each of which is configured to measure torque output by one of the motors. The surgical robotic arm also includes a controller configured to receive a torque measurement from each of the torque sensors and control each of the motors to apply a minimum torque to maintain a minimum tension on each of the cables based on the torque measurement from each of the torque sensors.

20 Claims, 17 Drawing Sheets

(56) References Cited

U.S. PATENT DOCUMENTS

| | | | | | |
|---|---|---|---|---|---|
| 6,036,667 | A * | 3/2000 | Manna | A61B 17/320092 | |
| | | | | 606/205 | |
| 6,394,998 | B1 * | 5/2002 | Wallace | A61B 34/35 | |
| | | | | 901/29 | |
| 7,109,678 | B2 * | 9/2006 | Kraus | F16M 11/105 | |
| | | | | 318/560 | |
| 7,204,168 | B2 * | 4/2007 | Najafi | A61B 34/70 | |
| | | | | 74/471 XY | |
| 8,214,083 | B2 * | 7/2012 | Kawai | A61B 34/70 | |
| | | | | 600/118 | |
| 8,597,280 | B2 * | 12/2013 | Cooper | A61B 34/71 | |
| | | | | 606/1 | |
| 8,644,988 | B2 * | 2/2014 | Prisco | A61B 34/71 | |
| | | | | 604/528 | |
| 8,821,480 | B2 * | 9/2014 | Burbank | A61B 34/30 | |
| | | | | 606/1 | |
| 9,046,907 | B2 * | 6/2015 | Molaro | H02M 7/53873 | |
| 9,072,536 | B2 * | 7/2015 | Shelton, IV | A61B 34/30 | |
| 9,962,228 | B2 * | 5/2018 | Schuh | A61B 34/74 | |
| 10,172,679 | B2 * | 1/2019 | Mewes | A61B 34/20 | |
| 10,524,870 | B2 * | 1/2020 | Saraliev | A61B 90/37 | |
| 11,033,296 | B2 * | 6/2021 | Carlson | A61B 10/04 | |
| 11,540,889 | B2 * | 1/2023 | Brisson | A61B 34/71 | |
| 12,023,066 | B2 * | 7/2024 | Carlson | A61B 5/061 | |
| 12,082,900 | B2 * | 9/2024 | Ratia | A61B 34/74 | |
| 12,089,909 | B2 * | 9/2024 | Brisson | A61B 34/35 | |
| 2002/0064341 | A1 * | 5/2002 | Fauver | G02B 6/3502 | |
| | | | | 359/210.1 | |
| 2002/0120363 | A1 * | 8/2002 | Salisbury | B25J 9/1643 | |
| | | | | 700/254 | |
| 2005/0183532 | A1 * | 8/2005 | Najafi | B25J 17/0266 | |
| | | | | 74/490.01 | |
| 2007/0132419 | A1 * | 6/2007 | Hashimoto | B25J 5/007 | |
| | | | | 318/568.12 | |
| 2007/0232858 | A1 * | 10/2007 | Macnamara | A61B 1/0057 | |
| | | | | 600/149 | |
| 2007/0233044 | A1 * | 10/2007 | Wallace | A61M 25/01 | |
| | | | | 604/528 | |
| 2007/0260356 | A1 * | 11/2007 | Kock | G05B 13/025 | |
| | | | | 901/30 | |
| 2007/0270685 | A1 * | 11/2007 | Kang | A61B 90/03 | |
| | | | | 600/424 | |
| 2008/0209650 | A1 * | 9/2008 | Brewer | A61C 17/221 | |
| | | | | 433/119 | |
| 2009/0292165 | A1 * | 11/2009 | Sugiyama | A61B 34/30 | |
| | | | | 600/106 | |
| 2010/0152898 | A1 * | 6/2010 | Reiland | B25J 9/1633 | |
| | | | | 700/261 | |
| 2011/0003656 | A1 * | 1/2011 | Bennett | A61B 34/71 | |
| | | | | 474/101 | |
| 2011/0015786 | A1 * | 1/2011 | Kawai | A61B 1/0016 | |
| | | | | 700/256 | |
| 2011/0230875 | A1 * | 9/2011 | Walberg | A61B 17/295 | |
| | | | | 606/33 | |
| 2012/0071895 | A1 * | 3/2012 | Stahler | A61B 34/35 | |
| | | | | 606/130 | |
| 2012/0109184 | A1 * | 5/2012 | Spivey | A61B 17/00234 | |
| | | | | 606/205 | |
| 2012/0289973 | A1 * | 11/2012 | Prisco | A61B 34/30 | |
| | | | | 606/130 | |
| 2013/0241514 | A1 * | 9/2013 | Molaro | H03K 7/08 | |
| | | | | 323/283 | |
| 2014/0000411 | A1 * | 1/2014 | Shelton, IV | A61B 34/37 | |
| | | | | 74/650 | |
| 2015/0088161 | A1 * | 3/2015 | Hata | A61B 1/0016 | |
| | | | | 606/130 | |
| 2015/0133963 | A1 * | 5/2015 | Barbagli | B25J 9/1689 | |
| | | | | 606/130 | |
| 2015/0289942 | A1 * | 10/2015 | Au | A61B 34/30 | |
| | | | | 606/130 | |
| 2017/0095297 | A1 * | 4/2017 | Richmond | A61B 1/00006 | |
| 2017/0127911 | A1 * | 5/2017 | Yamamoto | A61B 1/0052 | |
| 2017/0273712 | A1 * | 9/2017 | Carlson | A61B 10/04 | |
| 2018/0055583 | A1 * | 3/2018 | Schuh | A61B 34/37 | |
| 2018/0228563 | A1 * | 8/2018 | Smaby | A61B 34/71 | |
| 2019/0231464 | A1 * | 8/2019 | Wixey | A61B 34/71 | |
| 2019/0289512 | A1 * | 9/2019 | Kaneda | B64U 70/97 | |
| 2020/0275984 | A1 * | 9/2020 | Brisson | A61B 34/35 | |
| 2021/0128248 | A1 * | 5/2021 | Cohen | A61B 18/14 | |
| 2021/0186556 | A1 * | 6/2021 | Carlson | A61B 5/061 | |
| 2021/0369384 | A1 * | 12/2021 | Lin | A61B 90/06 | |
| 2022/0313349 | A1 * | 10/2022 | Lath | A61B 18/1442 | |
| 2023/0182303 | A1 * | 6/2023 | Wells | A61B 34/30 | |
| | | | | 700/250 | |

\* cited by examiner

SURGICAL ROBOTIC SYSTEM FOR CONTROLLING WRISTED INSTRUMENTS

CROSS REFERENCE TO RELATED APPLICATIONS

The present application is a U.S. National Stage Application filed under 35 U.S.C. § 371 (a) of International Patent Application No. PCT/US2021/048416, filed Aug. 31, 2021, which claims the benefit of and priority to U.S. Patent Provisional Application No. 63/078,495, filed Sep. 15, 2020, and U.S. Patent Provisional Application No. 63/114,616, filed Nov. 17, 2020. The entire disclosures of the foregoing applications are incorporated by reference herein.

BACKGROUND

Technical Field

The present disclosure generally relates to a surgical robotic system having one or more modular arm carts each of which supports a robotic arm, and a surgical console for controlling the carts and their respective arms. More particularly, the present disclosure is directed to a system and method for detecting, calibrating and controlling an instrument through an instrument drive unit of the robotic arm.

Background of Related Art

Surgical robotic systems are currently being used in minimally invasive medical procedures. Some surgical robotic systems include a surgical console controlling a surgical robotic arm and a surgical instrument having an end effector (e.g., forceps or grasping instrument) coupled to and actuated by the robotic arm. In operation, the robotic arm is moved to a position over a patient and then guides the surgical instrument into a small incision via a surgical port or a natural orifice of a patient to position the end effector at a work site within the patient's body.

Due to remote operation of surgical robotic instruments, actuation of the instrument needs to exactly reflect the movement commands input remotely at a surgical console. Thus, there is a need to provide for precise operation of the surgical robotic instruments.

SUMMARY

According to one embodiment of the present disclosure, a surgical robotic arm is disclosed. The surgical robotic arm includes an instrument having a plurality of couplers rotatable about a longitudinal axis, each of the couplers including a drive screw and a plurality of drive nuts each of which is threadably coupled to one of the drive screws. The drive nuts are movable along the respective coupler's longitudinal axis in response to rotation of their respective drive screws. The instrument also includes a plurality of cables each of which is coupled to one of the drive nuts and movable in response to movement of their respective drive nut, and an end effector including a pair of jaw members movable by the cables. The surgical robotic arm also includes a drive unit coupled the surgical instrument. The drive unit includes a plurality of motors each of which is configured to engage one of the couplers and to rotate the coupler and the drive screw. The drive unit also includes a controller coupled the motors and configured to activate the motors such that adjustment of the end effector is made in a null space.

According to one aspect of the above embodiment, the controller is further configured to activate a first motor of the plurality of motors in a first direction and to activate a second motor of the plurality of motors in a second direction, same as the first direction, the first and second motors being activated at a same torque to adjust the end effector in the null space. The jaw members remain stationary while imparting additional pressure in response to activation of the first and second motors.

According to another aspect of the above embodiment, the drive unit includes a plurality of sensors each of which is configured to measure a property of each of the motors. The sensors may be current sensors configured to measure current. The controller may include a current limiter configured to limit current supplied to the motors during adjustment of the end effector in the null space based on current measured by the current sensors. The current limiter is configured to determine a maximum current based on the current measured by the current sensors and to calculate a current scaling factor used by the current limiter to limit the current supplied to the motors.

According to a further aspect of the above embodiment, the sensors may be torque sensors configured to measure torque. The controller may include a torque limiter configured to limit torque during adjustment of the end effector in the null space based on torque measured by the torque sensors. The torque limiter is configured to determine a maximum torque based on the torque measured by the torque sensors and to calculate a torque scaling factor used by the torque limiter to limit the torque applied by the motors.

According to another embodiment of the present disclosure, a method for controlling a surgical robotic arm is disclosed. The method includes coupling an instrument to a drive unit, the instrument including an end effector having a pair of jaw members movable by a plurality of cables, the drive unit having a plurality of motors each of which is configured to move one of the cables. The method also includes activating the motors to adjust the end effector in a null space, such that the jaw members apply additional pressure without imparting movement on the end effector.

According to one aspect of the above embodiment, the method further includes activating a first motor of the plurality of motors in a first direction and activating a second motor of the plurality of motors in a second direction, same as the first direction, the first and second motors being activated at a same torque to adjust the end effector in the null space. The jaw members remain stationary while imparting additional pressure in response to activation of the first and second motors.

According to another aspect of the above embodiment, the method further includes measuring a property of each of the motors through a plurality of sensors each of which is coupled to one of the motors. Measuring the property may include measuring current supplied to the motors. The method may further include limiting current supplied to the motors during adjustment of the end effector in the null space based on current supplied to the motors. The method may also include determining a maximum current based on the measured current and calculating a current scaling factor used to limit the current supplied to the motors.

According to a further aspect of the above embodiment, measuring the property may include measuring torque applied by the motors. The method may also include limiting torque during adjustment of the end effector in the null space based on torque applied by the motors. The method may further include determining a maximum torque based on the measured torque, and calculating a torque scaling factor used to limit the torque applied by the motors.

According to one embodiment of the present disclosure, a surgical robotic arm is disclosed. The surgical robotic arm includes an instrument having a plurality of cables that are movable longitudinally and an end effector including a pair of jaw members movable by the cables. The surgical robotic arm also includes a drive unit having a plurality of motors each of which is configured to move one of the cables. The drive unit also includes a controller coupled the motors and configured to activate the motors in an over-stroke mode upon contacting tissue, wherein during the over-stroke mode the pair of jaw members are actuated to apply additional pressure on the tissue without movement of the end effector.

According to another aspect of the above embodiment, the instrument further includes a plurality of couplers rotatable about a longitudinal axis, each of the couplers including a drive screw, and a plurality of drive nuts each of which is threadably coupled to one of the drive screws. The drive nuts are movable along the longitudinal axes of their respective couplers in response to rotation of their respective drive screw. Each of the plurality of cables is coupled to one of the drive nuts and movable in response to movement of their respective drive nut.

According to a further aspect of the above embodiment, the controller is further configured to activate a first motor of the plurality of motors in a first direction and to activate a second motor of the plurality of motors in a second direction, same as the first direction, the first and second motors being activated at a same torque to apply additional pressure on the tissue.

According to yet another aspect of the above embodiment, the controller is further configured to transform a desired configuration of the end effector into activation commands for the plurality of motors while maintaining minimum torque applied by the motors to the cables. The end effector further includes a proximal portion pivotable about a first pin relative to a longitudinal axis defined by the instrument defining a yaw angle of the end effector. The end effector further includes a distal portion pivotable about a second pin relative to the proximal portion defining a pitch angle of the end effector. The controller is further configured to compensate for the additional pressure based on the yaw angle and the pitch angle.

According to another embodiment of the present disclosure, a surgical robotic system is disclosed. The surgical robotic system includes a surgical console including at least one input device configured to receive user input and a surgical robotic arm, which includes an instrument having a plurality of cables that are movable longitudinally and an end effector including a pair of jaw members movable by the cables. The surgical robotic arm also includes a drive unit having a plurality of motors each of which is configured to move one of the cables. The drive unit also includes a position controller coupled the motors and configured to transform the user input indicative of a desired position of the end effector into activation commands for the plurality of motors. The position controller is also configured to activate the motors in an over-stroke mode upon contacting tissue, wherein during the over-stroke mode the pair of jaw members are actuated to apply additional pressure on the tissue without movement of the end effector.

According to another aspect of the above embodiment, the instrument further includes a plurality of couplers rotatable about a longitudinal axis, each of the couplers including a drive screw, and a plurality of drive nuts each of which is threadably coupled to one of the drive screws. The drive nuts are movable along the longitudinal axes of their respective couplers in response to rotation of their respective drive screw. Each of the plurality of cables is coupled to one of the drive nuts and movable in response to movement of their respective drive nut.

According to a further aspect of the above embodiment, the controller is further configured to activate a first motor of the plurality of motors in a first direction and to activate a second motor of the plurality of motors in a second direction, same as the first direction, the first and second motors being activated at a same torque to apply additional pressure on the tissue.

According to yet another aspect of the above embodiment, the controller is further configured to transform a desired configuration of the end effector into activation commands for the plurality of motors while maintaining minimum torque applied by the motors to the cables. The end effector further includes a proximal portion pivotable about a first pin relative to a longitudinal axis defined by the instrument defining a yaw angle of the end effector. The end effector further includes a distal portion pivotable about a second pin relative to the proximal portion defining a pitch angle of the end effector. The controller is further configured to compensate for the additional pressure based on the yaw angle and the pitch angle.

According to a further embodiment, a method for controlling a surgical robotic instrument is disclosed. The method includes inputting a user command indicative of a desired position of an end effector of a surgical robotic instrument and transforming the user command indicative of the desired position of the end effector into activation commands controlling a plurality of motors. The method further includes determining whether jaw members of the end effector contacted tissue based on measured torque, and activating the plurality of motors to actuate the jaw members of the end effector in an over-stroke mode upon contacting tissue. During the over-stroke mode the jaw members are actuated to apply additional pressure on the tissue without movement of the end effector.

According to one aspect of the above embodiment, the method further includes activating a first motor of the plurality of motors in a first direction, and activating a second motor of the plurality of motors in a second direction, same as the first direction, the first and second motors being activated at a same torque to adjust the end effector in a null space. The method further includes maintaining a minimum torque applied by the motors to a plurality of cables actuating the jaw members.

According to another aspect of the above embodiment, the end effector further includes a proximal portion pivotable about a first pin relative to a longitudinal axis defined by the surgical robotic instrument defining a yaw angle of the end effector. The end effector further includes a distal portion pivotable about a second pin relative to the proximal portion defining a pitch angle of the end effector. The method includes compensating for the additional pressure based on the yaw angle and the pitch angle.

According to one embodiment, a surgical robotic arm is disclosed. The surgical robotic arm includes an instrument having a plurality of cables that are movable longitudinally, and an end effector having a plurality of segments, each pivotable about a pivot pin defining a degree of freedom and a pair of jaw members, wherein the segments and the pair of jaw members are movable by the cables. The surgical robotic arm also includes an instrument drive unit having a plurality of motors each of which is configured to move one of the cables, and a controller coupled the motors and configured to activate the motors to calibrate movement of the segments and the pair of jaw members.

According to one aspect of the above embodiment, instrument further includes: a plurality of couplers rotatable about a longitudinal axis, each of the couplers including a drive screw; and a plurality of drive nuts each of which is threadably coupled to one of the drive screws, the drive nuts movable along the respective coupler's longitudinal axis in response to rotation of their respective drive screw. Each of the plurality of cables is coupled to one of the drive nuts and movable in response to movement of their respective drive nut.

According to another aspect of the above embodiment, the controller is further configured to move the pair of jaw members at a preset angular velocity until the pair of jaw members reach a closed position within a first preset time period to calibrate a jaw angle between the pair of jaw members. The controller is further configured generate a jaw angle velocity profile for movement of the pair of jaw members based on calibration of the jaw angle.

According to a further aspect of the above embodiment, the end effector further includes a proximal portion pivotable about a first pin relative to a longitudinal axis defined by the instrument defining a yaw angle of the end effector. The controller is further configured to move the proximal portion between a positive yaw angle offset and a negative yaw angle offset and zero yaw offset to calibrate the yaw angle of the end effector. The controller is further configured to output an error in response to torque yaw angle calibration failing to reach a target torque threshold within a second preset time period. The controller is further configured generate a yaw angle velocity profile based on calibration of the yaw angle.

According to yet another aspect of the above embodiment, the end effector further includes a distal portion pivotable about a second pin relative to the proximal portion defining a pitch angle of the end effector. The controller is further configured to move the distal portion between a positive pitch angle offset and a negative pitch angle offset and zero pitch offset to calibrate the pitch angle of the end effector. The controller is further configured to output an error in response to torque pitch angle calibration failing to reach a target torque threshold within a second preset time period.

The controller is further configured generate a pitch angle velocity profile based on calibration of the pitch angle.

According to another embodiment of the present disclosure, a method for calibrating a surgical robotic instrument is disclosed. The method includes coupling a surgical robotic instrument to a drive unit. The surgical robotic instrument includes a plurality of cables that are movable longitudinally and an end effector having a plurality of segments, each pivotable about a pivot pin defining a degree of freedom and a pair of jaw members, wherein the segments and the pair of jaw members are movable by the cables. The method also includes calibrating the drive unit while the surgical robotic instrument is coupled to the drive unit, the drive unit including a plurality of motors each of is configured to move one of the cables. Calibrating includes activating the motors to calibrate movement of the segments and the pair of jaw members.

According to one aspect of the above embodiment, the method further includes moving the pair of jaw members at a preset angular velocity until the pair of jaw members reach a closed position within a first preset time period to calibrate a jaw angle between the pair of jaw members. The method further includes generating a jaw angle velocity profile for movement of the pair of jaw members based on calibration of the jaw angle.

According to another aspect of the above embodiment, the end effector further includes a proximal portion pivotable about a first pin relative to a longitudinal axis defined by the surgical robotic instrument defining a yaw angle of the end effector. The method further includes moving the proximal portion between a positive yaw angle offset and a negative yaw angle offset and zero yaw offset to calibrate the yaw angle of the end effector and outputting an error in response to torque yaw angle calibration failing to reach a target torque threshold within a second preset time period. The method also includes generating a yaw angle velocity profile based on calibration of the yaw angle.

According to a further aspect of the above embodiment, the end effector further includes a distal portion pivotable about a second pin relative to the proximal portion defining a pitch angle of the end effector. The method also includes: moving the distal portion between a positive pitch angle offset and a negative pitch angle offset and zero pitch offset to calibrate the pitch angle of the end effector; outputting an error in response to torque pitch angle calibration failing to reach a target torque threshold within a second preset time period; and generating a pitch angle velocity profile based on calibration of the pitch angle.

According to one embodiment of the present disclosure, a surgical robotic arm is disclosed. The surgical robotic arm includes an instrument having a plurality of cables that are movable longitudinally and an end effector movable by the cables. The surgical robotic arm also includes a drive unit having a plurality of motors each of which is configured to move one of the cables. The drive unit also includes a controller configured to compare a desired position of the end effector with an actual position of the end effector, and calculate an error between the actual position and the desired position. The controller is further configured to determine desired displacement the plurality of motors based on the error and control the plurality of motors to move the cables based on the desired displacement.

According to one aspect of the above embodiment, the error is indicative of a nonlinearity of the cables. The nonlinearity is selected from the group consisting of backlash, cable stretch, and stiction. The instrument further includes a cable displacement sensor configured to measure the actual position of the end effector.

According to another aspect of the above embodiment, the controller is further configured to receive actual motor position feedback and perform a comparison of the motor position feedback with the desired displacement. The controller is further configured to calculate movement commands for the motors based on the comparison. The surgical robotic arm further includes a plurality of motor encoders, each of which is coupled to one of the motors of the plurality of motors, each of the motor encoders is configured to measure displacement of each of the motors.

According to another embodiment of the present disclosure, a surgical robotic system is disclosed. The surgical robotic system includes a surgical console having at least one input device configured to receive user input and a surgical robotic arm. The surgical robotic arm includes an instrument having a plurality of cables that are movable longitudinally and an end effector movable by the cables. The surgical robotic arm also includes a drive unit having a plurality of motors each of which is configured to move one of the cables. The drive unit also includes a controller configured to compare a desired position of the end effector based on the user input with an actual position of the end effector and calculate an error between the actual position and the desired position. The controller is also configured to determine desired displacement the plurality of motors based on the error and control the plurality of motors to move the cables based on the desired displacement.

According to one aspect of the above embodiment, the error is indicative of a nonlinearity of the cables. The nonlinearity is selected from the group consisting of backlash, cable stretch, and stiction. The instrument further includes a cable displacement sensor configured to measure the actual position of the end effector.

According to another aspect of the above embodiment, the controller is further configured to receive actual motor position feedback and perform a comparison of the motor position feedback with the desired displacement. The controller is further configured to calculate movement commands for the motors based on the comparison. The drive unit may further include a plurality of motor encoders, each of which is coupled to one of the motors of the plurality of motors, each of the motor encoders is configured to measure displacement of each of the motors.

According to a further embodiment of the above embodiment, a method for controlling a surgical robotic instrument is disclosed. The method includes inputting a user command indicative of a desired position of an end effector of a surgical robotic instrument including a plurality of cables that are movable longitudinally configured to move the end effector and comparing a desired position of the end effector with an actual position of the end effector. The method also includes calculating an error between the actual position and the desired position and determining desired displacement based on the error for a plurality of motors each of which is configured to move one of the cables. The method further includes controlling the plurality of motors to move the cables based on the desired displacement.

According to one aspect of the above embodiment, the error is indicative of a nonlinearity of the cables. The nonlinearity is selected from the group consisting of backlash, cable stretch, and stiction. Measuring the actual position of the end effector is performed by a cable displacement sensor disposed within the end effector.

According to another aspect of the above embodiment, the method further includes receiving actual motor position feedback from a plurality of motor encoders, each of which is coupled to one of the motors of the plurality of motors, each of the motor encoders is configured to measure displacement of each of the motors. The method also includes performing a comparison of the motor position feedback with the desired displacement. The method additionally includes calculating movement commands for the motors based on the comparison.

According to one embodiment of the present disclosure, a surgical robotic arm is disclosed. The surgical robotic arm includes an instrument having a plurality of cables that are movable longitudinally and an end effector movable by the cables. The surgical robotic arm also includes a drive unit having a plurality of motors each of which is configured to move one of the cables and a plurality of torque sensors, each of which is configured to measure torque output by one of the motors. The surgical robotic arm also includes a controller configured to receive a torque measurement from each of the torque sensors and control each of the motors to apply a minimum torque to maintain a minimum tension on each of the cables based on the torque measurement from each of the torque sensors.

According to one aspect of the above embodiment, the controller may be further configured to compare each of the torque measurements to determine a maximum torque value. The controller may be further configured to perform a comparison of the maximum torque value to a threshold torque value.

According to another aspect of the above embodiment, the controller may be also configured to calculate a torque compensation value based on the comparison. The controller may be further configured to adjust the minimum torque applied by each of the motors based on the torque compensation value.

According to another embodiment of the present disclosure, a surgical robotic arm is disclosed. The surgical robotic arm includes an instrument having a plurality of cables that are movable longitudinally and an end effector movable by the cables. The surgical robotic arm also includes a drive unit having a plurality of motors each of which is configured to move one of the cables and a controller configured to control each of the motors to in a dithering pattern to maintain the end effector in a dynamic friction region.

According to one aspect of the above embodiment, the controller may be further configured to: compare a desired position of the end effector with an actual position of the end effector; and calculate an error between the actual position and the desired position. The controller may be also configured to determine desired displacement of each of the plurality of motors based on the error and control the plurality of motors to move the cables based on the desired displacement.

According to another aspect of the above embodiment, the error is indicative of a nonlinearity of the cables. The nonlinearity is selected from the group consisting of backlash, cable stretch, and stiction.

According to a further aspect of the above embodiment, the instrument may further include a cable displacement sensor configured to measure the actual position of the end effector. The controller may be further configured to receive actual motor position feedback; and perform a comparison of the motor position feedback with the desired displacement. The controller may be further configured to calculate movement commands for the motors based on the comparison. The drive unit may further include a plurality of encoders, each of which is coupled to one of the motors of the plurality of motors, each of the encoders is configured to measure displacement of each of the motors.

According to a further embodiment of the present disclosure, a method for controlling a surgical robotic instrument is disclosed. The method includes coupling an instrument to a drive unit. The instrument includes an end effector having a pair of jaw members movable by a plurality of cables. The drive unit includes a plurality of motors each of which is configured to move one of the cables. The method also includes measuring torque output by each of the motors by a plurality of torque sensors, each of which is coupled to one of the motors; and control each of the motors to apply a minimum torque to maintain a minimum tension on each of the cables based on a torque measurement from each of the torque sensors.

According to one aspect of the above embodiment, the method also includes comparing each of the torque measurements to determine a maximum torque value. The method may also include performing a comparison of the maximum torque value to a threshold torque value. The method may further include calculating a torque compensation value based on the comparison. The method may also include adjusting the minimum torque applied by each of the motors based on the torque compensation value.

BRIEF DESCRIPTION OF THE DRAWINGS

Various embodiments of the present disclosure are described herein with reference to the drawings wherein.

DETAILED DESCRIPTION

Figure 1:
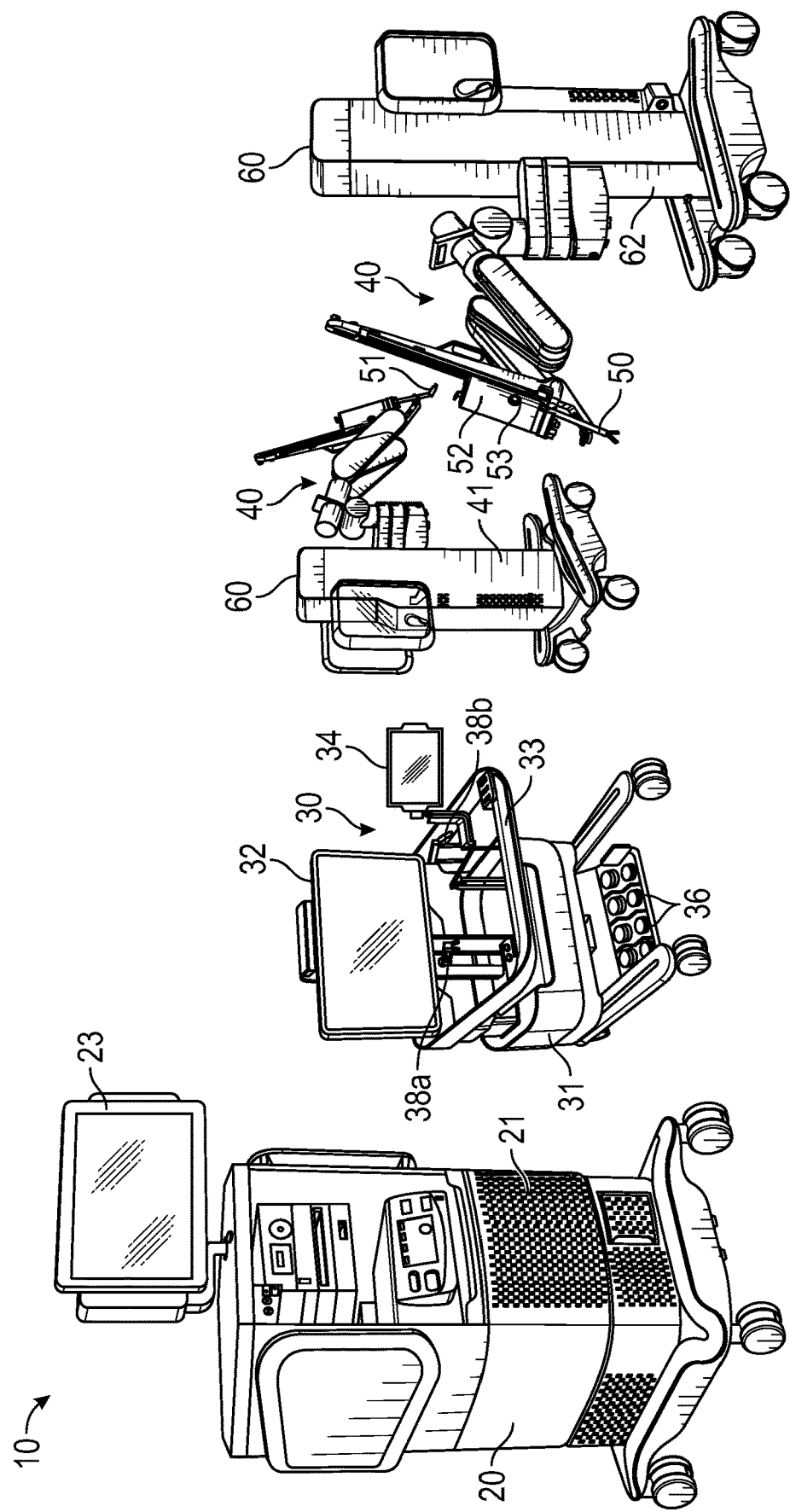
FIG. 1 is a schematic illustration of a surgical robotic system including a control tower, a console, and one or more surgical robotic arms according to an embodiment of the present disclosure.

Embodiments of the presently disclosed surgical robotic system are described in detail with reference to the drawings, in which like reference numerals designate identical or corresponding elements in each of the several views. As used herein the term "distal" refers to the portion of the surgical robotic system and/or the surgical instrument coupled thereto that is closer to the patient, while the term "proximal" refers to the portion that is farther from the patient.

The term "application" may include a computer program designed to perform functions, tasks, or activities for the benefit of a user. Application may refer to, for example, software running locally or remotely, as a standalone program or in a web browser, or other software which would be understood by one skilled in the art to be an application. An application may run on a controller, or on a user device, including, for example, a mobile device, a personal computer, or a server system.

As will be described in detail below, the present disclosure is directed to a surgical robotic system, which includes a surgical console, a control tower, and one or more movable carts having a surgical robotic arm coupled to a setup arm. The surgical console receives user input through one or more interface devices, which are interpreted by the control tower as movement commands for moving the surgical robotic arm. The surgical robotic arm includes a controller, which is configured to process the movement command and to generate a torque command for activating one or more actuators of the robotic arm, which would, in turn, move the robotic arm in response to the movement command.

With reference to FIG. 1, a surgical robotic system 10 includes a control tower 20, which is connected to all of the components of the surgical robotic system 10 including a surgical console 30 and one or more robotic arms 40. Each of the robotic arms 40 includes a surgical instrument 50 removably coupled thereto. Each of the robotic arms 40 is also coupled to a movable cart 60.

The surgical instrument 50 is configured for use during minimally invasive surgical procedures. In embodiments, the surgical instrument 50 may be configured for open surgical procedures. In embodiments, the surgical instrument 50 may be an endoscope, such as an endoscopic camera 51, configured to provide a video feed for the user. In further embodiments, the surgical instrument 50 may be an electrosurgical forceps configured to seal tissue by compressing tissue between jaw members and applying electrosurgical current thereto. In yet further embodiments, the surgical instrument 50 may be a surgical stapler including a pair of jaws configured to grasp and clamp tissue while deploying a plurality of tissue fasteners, e.g., staples, and cutting stapled tissue.

One of the robotic arms 40 may include a camera 51 configured to capture video of the surgical site. The surgical console 30 includes a first display 32, which displays a video feed of the surgical site provided by camera 51 of the surgical instrument 50 disposed on the robotic arms 40, and a second display 34, which displays a user interface for controlling the surgical robotic system 10. The first and second displays 32 and 34 are touchscreens allowing for displaying various graphical user inputs.

The surgical console 30 also includes a plurality of user interface devices, such as foot pedals 36 and a pair of hand controllers 38a and 38b which are used by a user to remotely control robotic arms 40. The surgical console further includes an armrest 33 used to support clinician's arms while operating the handle controllers 38a and 38b.

The control tower 20 includes a display 23, which may be a touchscreen, and outputs on the graphical user interfaces (GUIs). The control tower 20 also acts as an interface between the surgical console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgical console 30, in such a way that robotic arms 40 and the surgical instrument 50 execute a desired movement sequence in response to input from the foot pedals 36 and the hand controllers 38a and 38b.

Each of the control tower 20, the surgical console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area networks, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 122.15.4-2003 standard for wireless personal area networks (WPANs)).

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
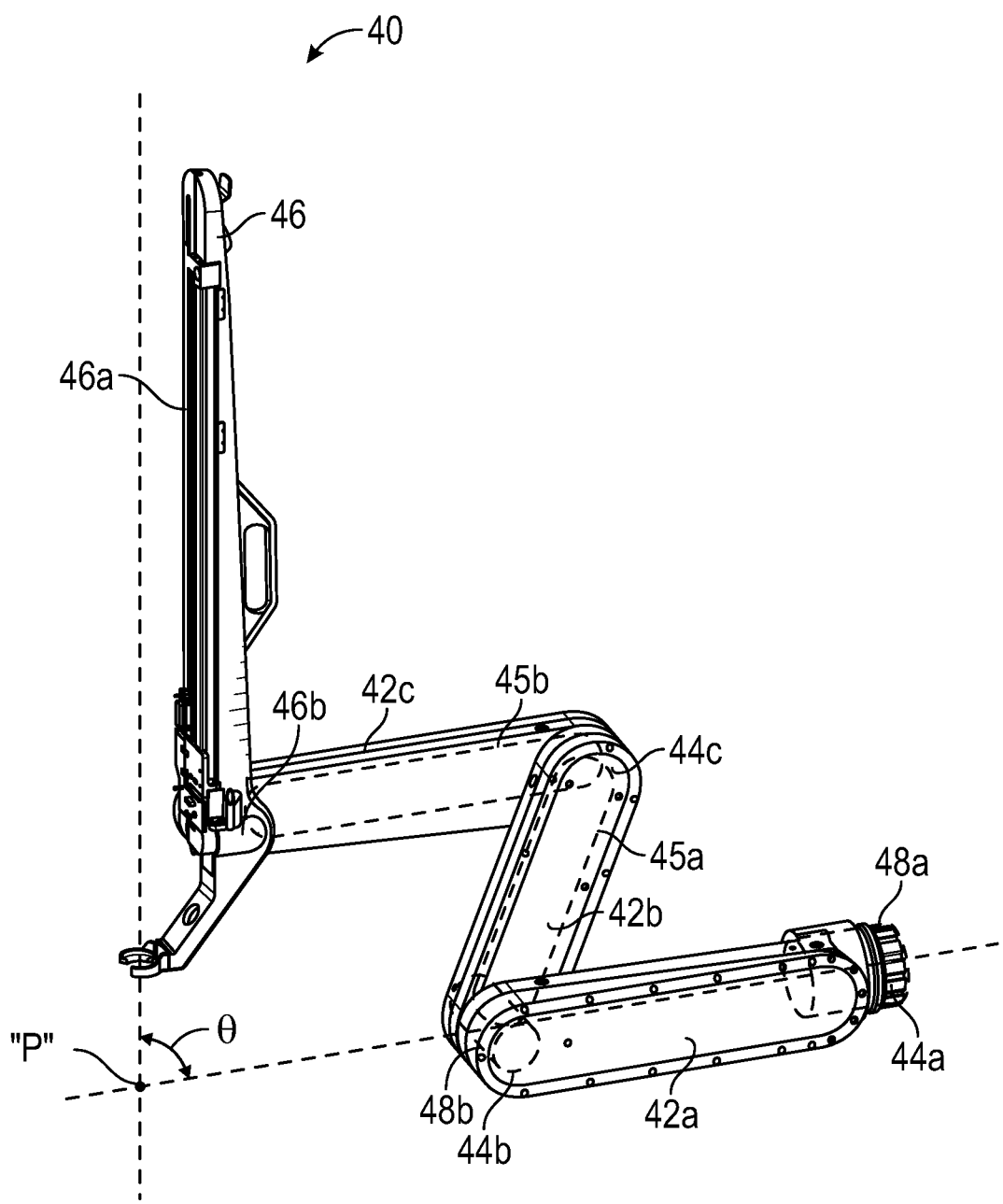
FIG. 2 is a perspective view of a surgical robotic arm of the surgical robotic system of FIG. 1 according to an embodiment of the present disclosure.
Figure 3:
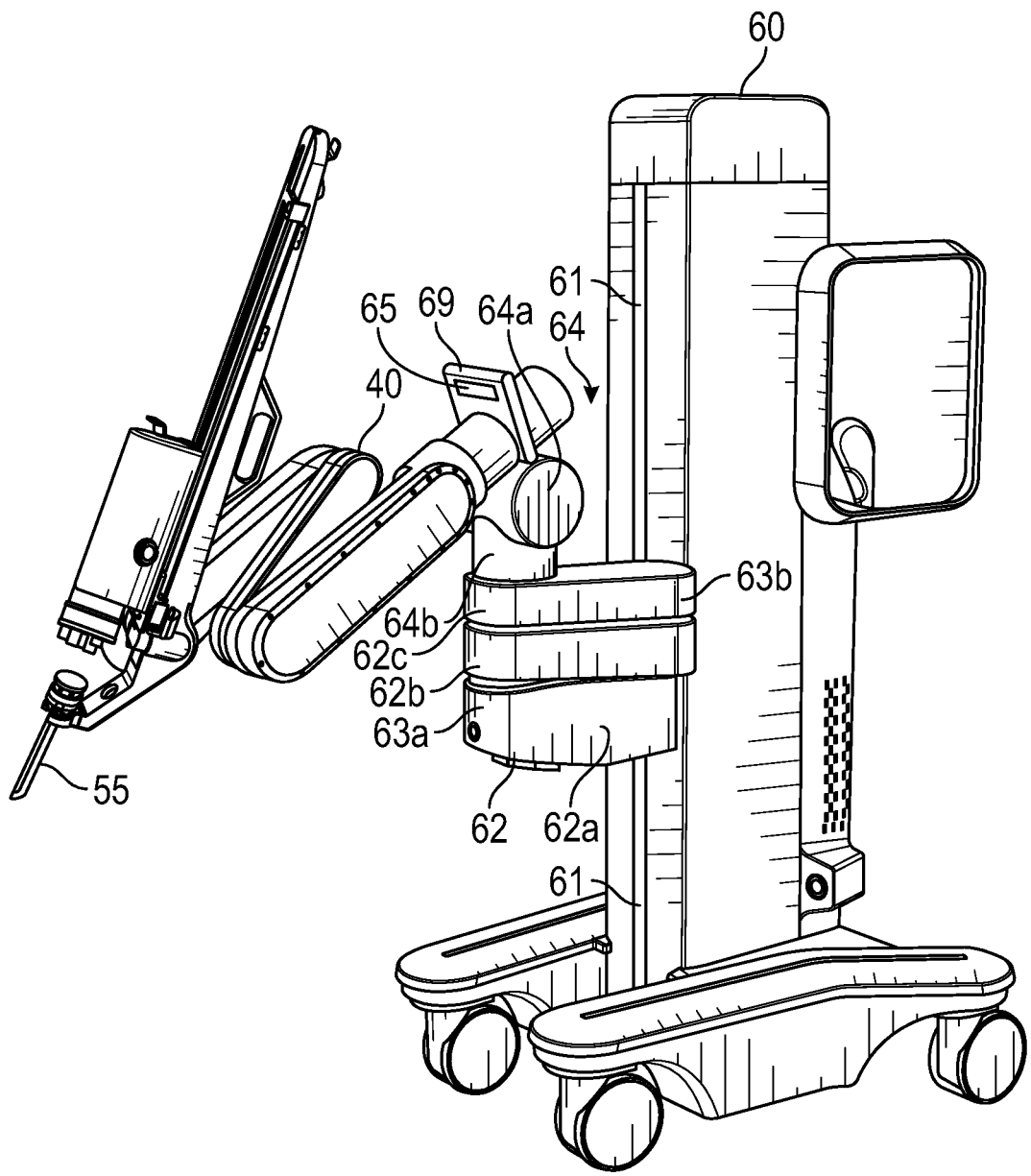
FIG. 3 is a perspective view of a setup arm with the surgical robotic arm of the surgical robotic system of FIG. 1 according to an embodiment of the present disclosure.

With reference to FIG. 2, each of the robotic arms 40 may include a plurality of links 42a, 42b, 42c, which are interconnected at joints 44a, 44b, 44c, respectively. The joint 44a is configured to secure the robotic arm 40 to the movable cart 60 and defines a first longitudinal axis. With reference to FIG. 3, the movable cart 60 includes a lift 61 and a setup arm 62, which provides a base for mounting of the robotic arm 40. The lift 61 allows for vertical movement of the setup arm 62. The movable cart 60 also includes a display 69 for displaying information pertaining to the robotic arm 40.

The setup arm 62 includes a first link 62a, a second link 62b, and a third link 62c, which provide for lateral maneuverability of the robotic arm 40. The links 62a, 62b, 62c are interconnected at joints 63a and 63b, each of which may include an actuator (not shown) for rotating the links 62b and 62b relative to each other and the link 62c. In particular, the links 62a, 62b, 62c are movable in their corresponding lateral planes that are parallel to each other, thereby allowing for extension of the robotic arm 40 relative to the patient (e.g., surgical table). In embodiments, the robotic arm 40 may be coupled to the surgical table (not shown). The setup arm 62 includes controls 65 for adjusting movement of the links 62a, 62b, 62c as well as the lift 61.

The third link 62c includes a rotatable base 64 having two degrees of freedom. In particular, the rotatable base 64 includes a first actuator 64a and a second actuator 64b. The first actuator 64a is rotatable about a first stationary arm axis which is perpendicular to a plane defined by the third link 62c and the second actuator 64b is rotatable about a second stationary arm axis which is transverse to the first stationary arm axis. The first and second actuators 64a and 64b allow for full three-dimensional orientation of the robotic arm 40.

The actuator 48b of the joint 44b is coupled to the joint 44c via the belt 45a, and the joint 44c is in turn coupled to the joint 46c via the belt 45b. Joint 44c may include a transfer case coupling the belts 45a and 45b, such that the actuator 48b is configured to rotate each of the links 42b, 42c and the holder 46 relative to each other. More specifically, links 42b, 42c, and the holder 46 are passively coupled to the actuator 48b which enforces rotation about a pivot point "P" which lies at an intersection of the first axis defined by the link 42a and the second axis defined by the holder 46. Thus, the actuator 48b controls the angle θ between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle θ. In embodiments, some or all of the joints 44a, 44b, 44c may include an actuator to obviate the need for mechanical linkages.

The joints 44a and 44b include an actuator 48a and 48b configured to drive the joints 44a, 44b, 44c relative to each other through a series of belts 45a and 45b or other mechanical linkages such as a drive rod, a cable, or a lever and the like. In particular, the actuator 48a is configured to rotate the robotic arm 40 about a longitudinal axis defined by the link 42a.

With reference to FIG. 2, the robotic arm 40 also includes a holder 46 defining a second longitudinal axis and configured to receive an instrument drive unit (IDU) 52 (FIG. 1). The IDU 52 is configured to couple to an actuation mechanism of the surgical instrument 50 and the camera 51 and is configured to move (e.g., rotate) and actuate the instrument 50 and/or the camera 51. IDU 52 transfers actuation forces from its actuators to the surgical instrument 50 to actuate components (e.g., end effector) of the surgical instrument 50. The holder 46 includes a sliding mechanism 46a, which is configured to move the IDU 52 along the second longitudinal axis defined by the holder 46. The holder 46 also includes a joint 46b, which rotates the holder 46 relative to the link 42c. During endoscopic procedures, the instrument 50 may be inserted through an endoscopic port 55 (FIG. 3) held by the holder 46.

The robotic arm 40 also includes a plurality of manual override buttons 53 (FIG. 1) disposed on the IDU 52 and the setup arm 62, which may be used in a manual mode. The user may press one or more of the buttons 53 to move the component associated with the button 53.

Figure 4:
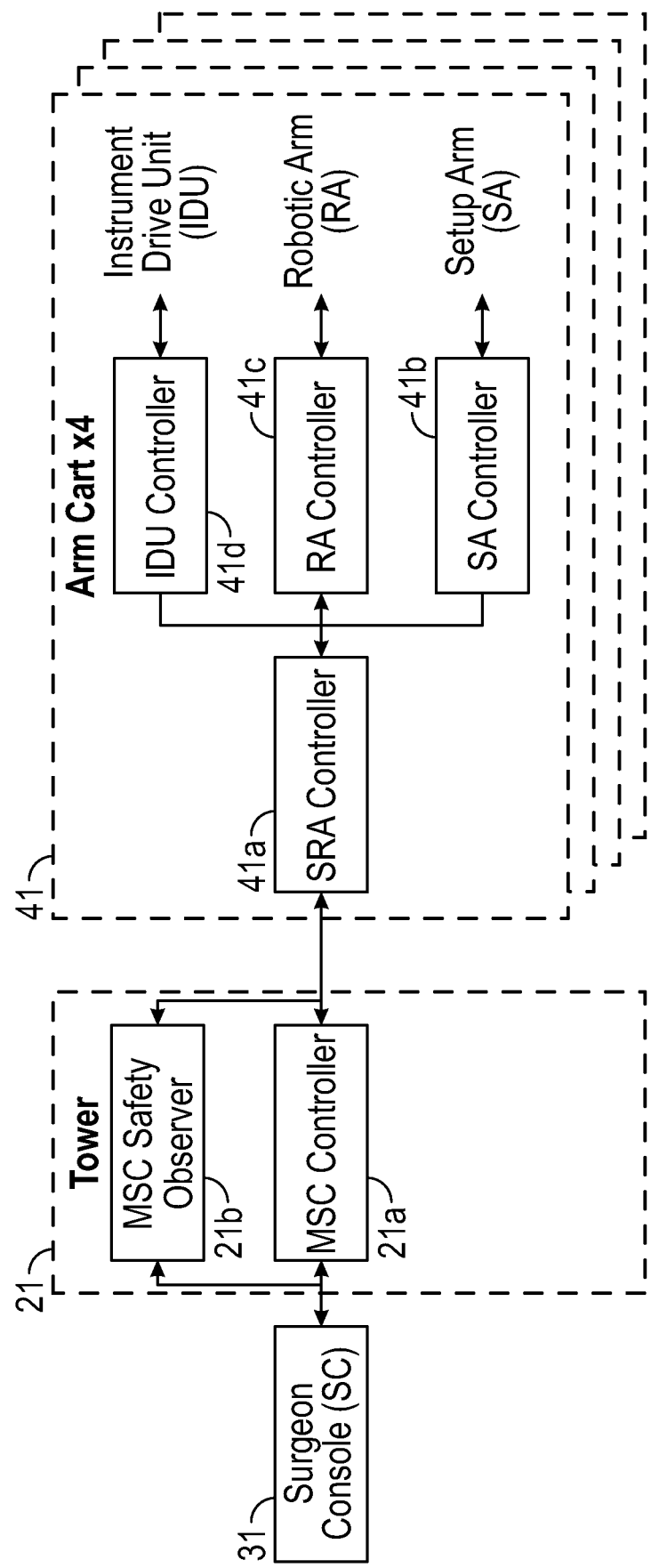
FIG. 4 is a schematic diagram of a computer architecture of the surgical robotic system of FIG. 1 according to an embodiment of the present disclosure.

With reference to FIG. 4, each of the computers 21, 31, 41 of the surgical robotic system 10 may include a plurality of controllers, which may be embodied in hardware and/or software. The computer 21 of the control tower 20 includes a controller 21a and safety observer 21b. The controller 21a receives data from the computer 31 of the surgical console 30 about the current position and/or orientation of the hand controllers 38a and 38b and the state of the foot pedals 36 and other buttons. The controller 21a processes these input positions to determine desired drive commands for each joint of the robotic arm 40 and/or the IDU 52 and communicates these to the computer 41 of the robotic arm 40. The controller 21a also receives the actual joint angles measured by encoders of the actuators 48a and 48b and uses this information to determine force feedback commands that are transmitted back to the computer 31 of the surgical console 30 to provide haptic feedback through the hand controllers 38a and 38b. The safety observer 21b performs validity checks on the data going into and out of the controller 21a and notifies a system fault handler if errors in the data transmission are detected to place the computer 21 and/or the surgical robotic system 10 into a safe state.

The computer 41 includes a plurality of controllers, namely, a main cart controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the movable cart 60, the robotic arm 40, and the IDU 52. The main cart controller 41a also communicates actual joint angles back to the controller 21a.

The setup arm controller 41b controls each of joints 63a and 63b, and the rotatable base 64 of the setup arm 62 and calculates desired motor movement commands (e.g., motor torque) for the pitch axis and controls the brakes. The robotic arm controller 41c controls each joint 44a and 44b of the robotic arm 40 and calculates desired motor torques required for gravity compensation, friction compensation, and closed loop position control of the robotic arm 40. The robotic arm controller 41c calculates a movement command based on the calculated torque. The calculated motor commands are then communicated to one or more of the actuators 48a and 48b in the robotic arm 40. The actual joint positions are then transmitted by the actuators 48a and 48b back to the robotic arm controller 41c.

The IDU controller 41d receives desired joint angles for the surgical instrument 50, such as wrist and jaw angles, and computes desired currents for the motors in the IDU 52. The IDU controller 41d calculates actual angles based on the motor positions and transmits the actual angles back to the main cart controller 41a.

The robotic arm 40 is controlled in response to a pose of the hand controller controlling the robotic arm 40, e.g., the hand controller 38a, which is transformed into a desired pose of the robotic arm 40 through a hand eye transform function executed by the controller 21a. The hand eye function, as well as other functions described herein, is/are embodied in software executable by the controller 21a or any other suitable controller described herein. The pose of one of the hand controller 38a may be embodied as a coordinate position and role-pitch-yaw ("RPY") orientation relative to a coordinate reference frame, which is fixed to the surgical console 30. The desired pose of the instrument 50 is relative to a fixed frame on the robotic arm 40. The pose of the hand controller 38a is then scaled by a scaling function executed by the controller 21a. In embodiments, the coordinate position is scaled down and the orientation is scaled up by the scaling function. In addition, the controller 21a also executes a clutching function, which disengages the hand controller 38a from the robotic arm 40. In particular, the controller 21a stops transmitting movement commands from the hand controller 38a to the robotic arm 40 if certain movement limits or other thresholds are exceeded and in essence acts like a virtual clutch mechanism, e.g., limits mechanical input from effecting mechanical output.

The desired pose of the robotic arm 40 is based on the pose of the hand controller 38a and is then passed by an inverse kinematics function executed by the controller 21a. The inverse kinematics function calculates angles for the joints 44a, 44b, 44c of the robotic arm 40 that achieve the scaled and adjusted pose input by the hand controller 38a. The calculated angles are then passed to the robotic arm controller 41c, which includes a joint axis controller having a proportional-derivative (PD) controller, the friction estimator module, the gravity compensator module, and a two-sided saturation block, which is configured to limit the commanded torque of the motors of the joints 44a, 44b, 44c.

Figure 5:
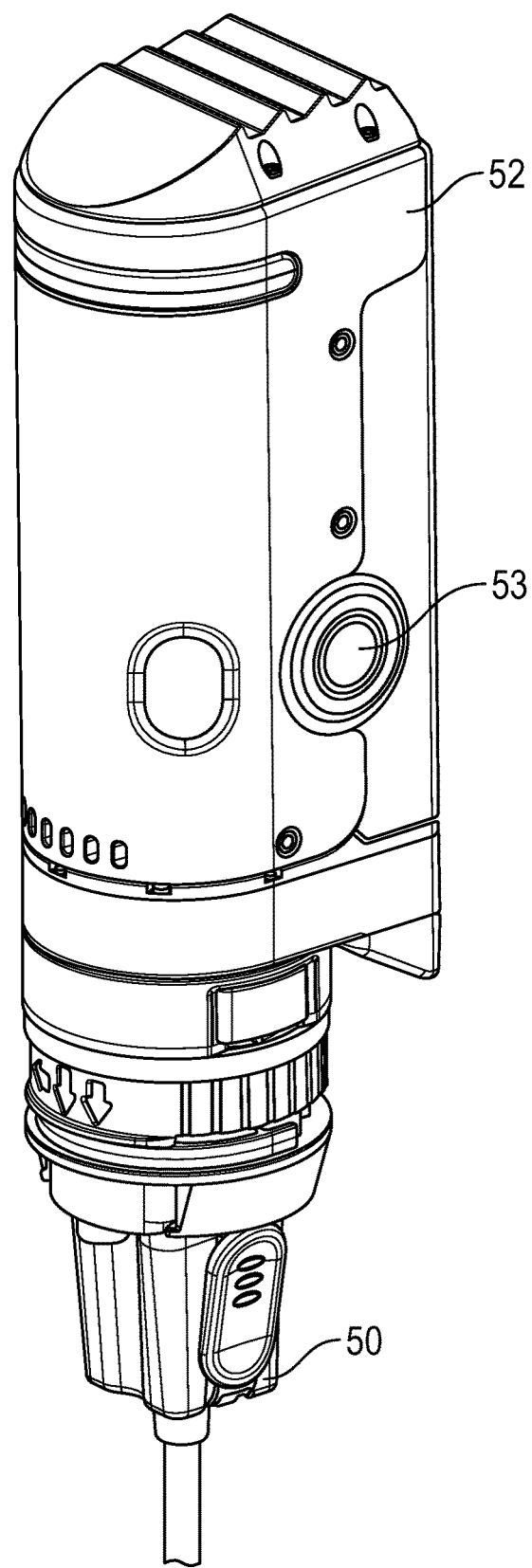
FIG. 5 is a perspective view of an instrument drive unit and a surgical instrument according to an embodiment of the present disclosure.
Figure 6:
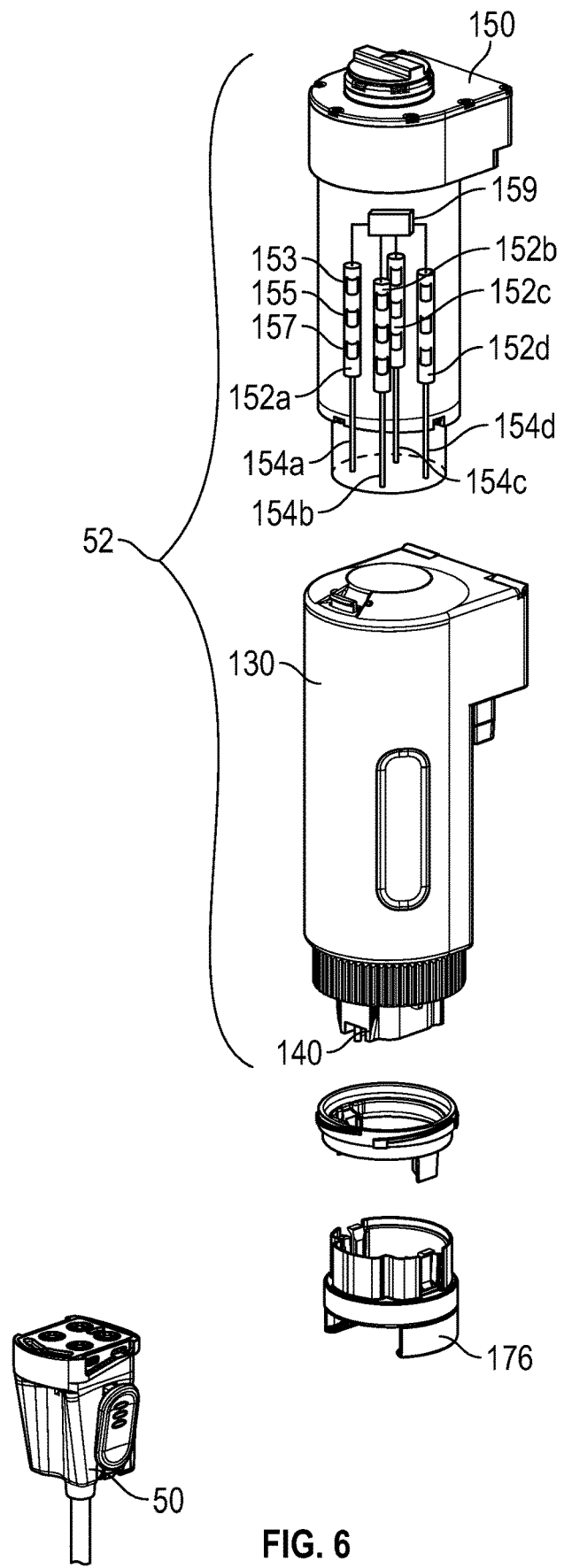
FIG. 6 is a perspective view, with parts separated, of the instrument drive unit and the surgical instrument shown in FIG. 5 according to an embodiment of the present disclosure.

With reference to FIGS. 5 and 6, the IDU 52 is shown in more detail and is configured to transfer power and actuation forces from its motors 152a, 152b, 152c, 152d to the instrument 50 to drive movement of components of the instrument 50, such as articulation, rotation, pitch, yaw, clamping, cutting, etc. The IDU 52 may also be configured for the activation or firing of an electrosurgical energy-based instrument or the like (e.g., cable drives, pulleys, friction wheels, rack and pinion arrangements, etc.).

Figure 7:
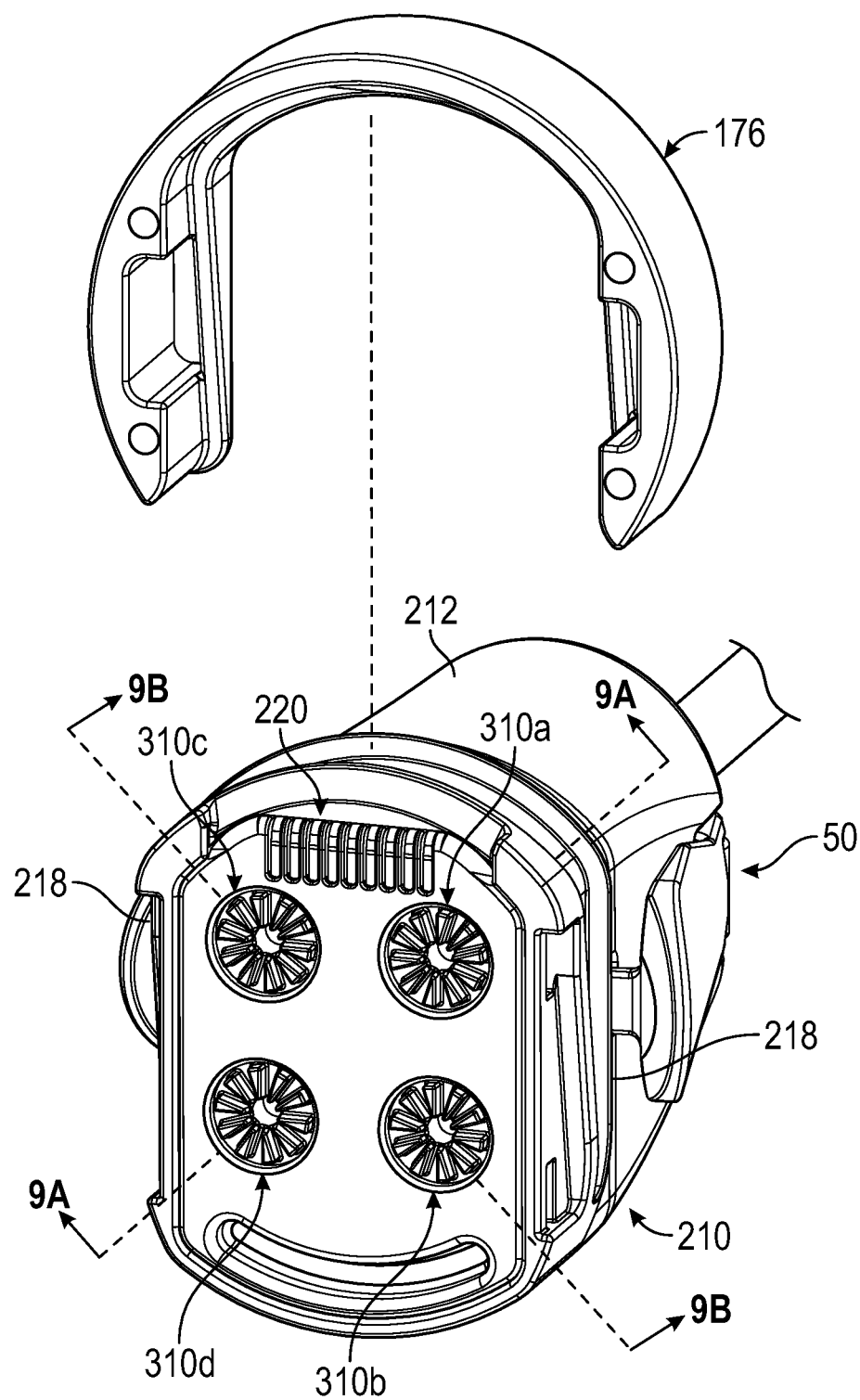
FIG. 7 is a rear perspective view of the surgical instrument for use with the robotic surgical assembly of FIGS. 5 and 6.

The IDU 52 includes a motor pack 150 and a sterile barrier housing 130. Motor pack 150 includes motors 152a, 152b, 152c, 152d for controlling various operations of the instrument 50. The instrument 50 is removably coupleable to IDU 52. As the motors 152a, 152b, 152c, 152d of the motor pack 150 are actuated, rotation of the drive transfer shafts 154a, 154b, 154c, 154d of the motors 152a, 152b, 152c, 152d, respectively, is transferred to the respective proximal couplers 310a, 310b, 310c, 310d of the drive assemblies 300a, 300b, 300c, 300d (FIG. 7) of the instrument 50.

The instrument 50 may have an end effector 200 (FIG. 10) secured to a distal end thereof. The instrument 50 is configured to transfer rotational forces/movement supplied by the IDU 52 (e.g., via the motors 152a, 152b, 152c, 152d of the motor pack 150) into longitudinal movement or translation of the cables 380a, 380b, 380c, 380d to effect various functions of the end effector 200.

With reference to FIGS. 7-9B, the instrument 50 includes a housing assembly 210 with a housing 212 defining at least one cavity or bore 212a, 212b, 212c, 212d therein which is configured to receive a respective drive assembly 300a, 300b, 300c, 300d therein. In accordance with the present disclosure, each bore 212a, 212b, 212c, 212d of the housing 212 is configured to operatively support a respective drive assembly 300a, 300b, 300c, 300d therein.

Each bore 212a, 212b, 212c, 212d of the housing 212 defines a respective longitudinally extending groove or channel 213a, 213b, 213c, 213d therein. Each channel 213a, 213b, 213c, 213d is configured to slidingly accept a rail or tab 353a, 353b, 353c, 353d extending radially from a respective drive nut 350a, 350b, 350c, 350d of a respective drive assembly 300a, 300b, 300c, 300d.

When the instrument 50 is connected to the IDU 52, the proximal couplers 310a, 310b, 310c, 310d of the drive assemblies 300a, 300b, 300c, 300d of the instrument 50 come into registration with and are connected to respective drive transfer shafts 154a, 154b, 154c, 154d within the IDU 52 (FIGS. 5 and 6) to couple the respective drive assemblies 300a, 300b, 300c, 300d to respective motors 152a, 152b, 152c, 152d of the IDU 52.

The housing 212 of the housing assembly 210 of the instrument 50 also supports an electrical connector 220 (FIG. 7) configured for selective connection to the plug 140 of the IDU 52 (FIGS. 5 and 6) of the IDU 52. The instrument 50 may include electronics, including, and not limited to, a memory (for storing identification information, usage information, and the like), wired or wireless communication circuitry for receiving and transmitting data or information. The IDU 52 may be configured to permit passage or routing of a dedicated electrocautery cable or the like for use and connection to an electrosurgical based electromechanical surgical instrument (e.g., for ablation, coagulation, sealing, etc.). The electrical connector 220 may include and is not limited to conductive connectors, magnetic connectors, resistive connectors, capacitive connectors, Hall sensors, reed switches or the like. The instrument 50 may be secured to the IDU 52 via a coupler 176 configured to engage a guide 218.

With continued reference to FIGS. 7-9B, the housing assembly 210 of the instrument 50 houses a plurality of drive assemblies, shown as drive assemblies 300a, 300b, 300c, 300d. In the illustrated embodiment, the instrument 50 includes three drive assemblies 300a, 300b, 300c, 300d; however, the instrument 50 may include more (e.g., four, five, or six) or fewer (e.g., two) drive assemblies without departing from the scope of the present disclosure.

Each drive assembly 300a, 300b, 300c, 300d includes a respective proximal coupler 310a, 310b, 310c, 310d, a proximal bearing 320a, 320b, 320c, 320d, a drive screw 340a, 340b, 340c, 340d, a drive nut 350a, 350b, 350c, 350d, a biasing element 370a, 370b, 370c, 370d, and a cable 380a, 380b, 380c, 380d. The proximal coupler 310a, 310b, 310c, 310d of each drive assembly 300a, 300b, 300c, 300d is configured to meshingly engage with respective drive transfer shafts 154a, 154b, 154c, 154d coupled to respective motors of the IDU 52. In operation, rotation of the drive transfer shafts 154a, 154b, 154c, 154d of the motors 152a, 152b, 152c, 152d results in corresponding rotation of respective proximal coupler 310a, 310b, 310c, 310d of respective drive assembly 300a, 300b, 300c, 300d.

The proximal coupler 310a, 310b, 310c, 310d of each drive assembly 300a, 300b, 300c, 300d is keyed to or otherwise non-rotatably connected to a proximal end of a respective drive screw 340a, 340b, 340c, 340d. Accordingly, rotation of the proximal coupler 310a, 310b, 310c, 310d results in a corresponding rotation of a respective drive screw 340a, 340b, 340c, 340d.

Each proximal bearing 320a, 320b, 320c, 320d is disposed about a proximal portion of a respective drive screw 340a, 340b, 340c, 340d adjacent a proximal end of the housing 212 of the housing assembly 210. A distal end or tip of each drive screw 340a, 340b, 340c, 340d may be rotatably disposed or supported in a respective recess 214a, 214b, 214c, 214d defined in a distal end of the housing 212 (see FIGS. 9A-B).

Figure 8:
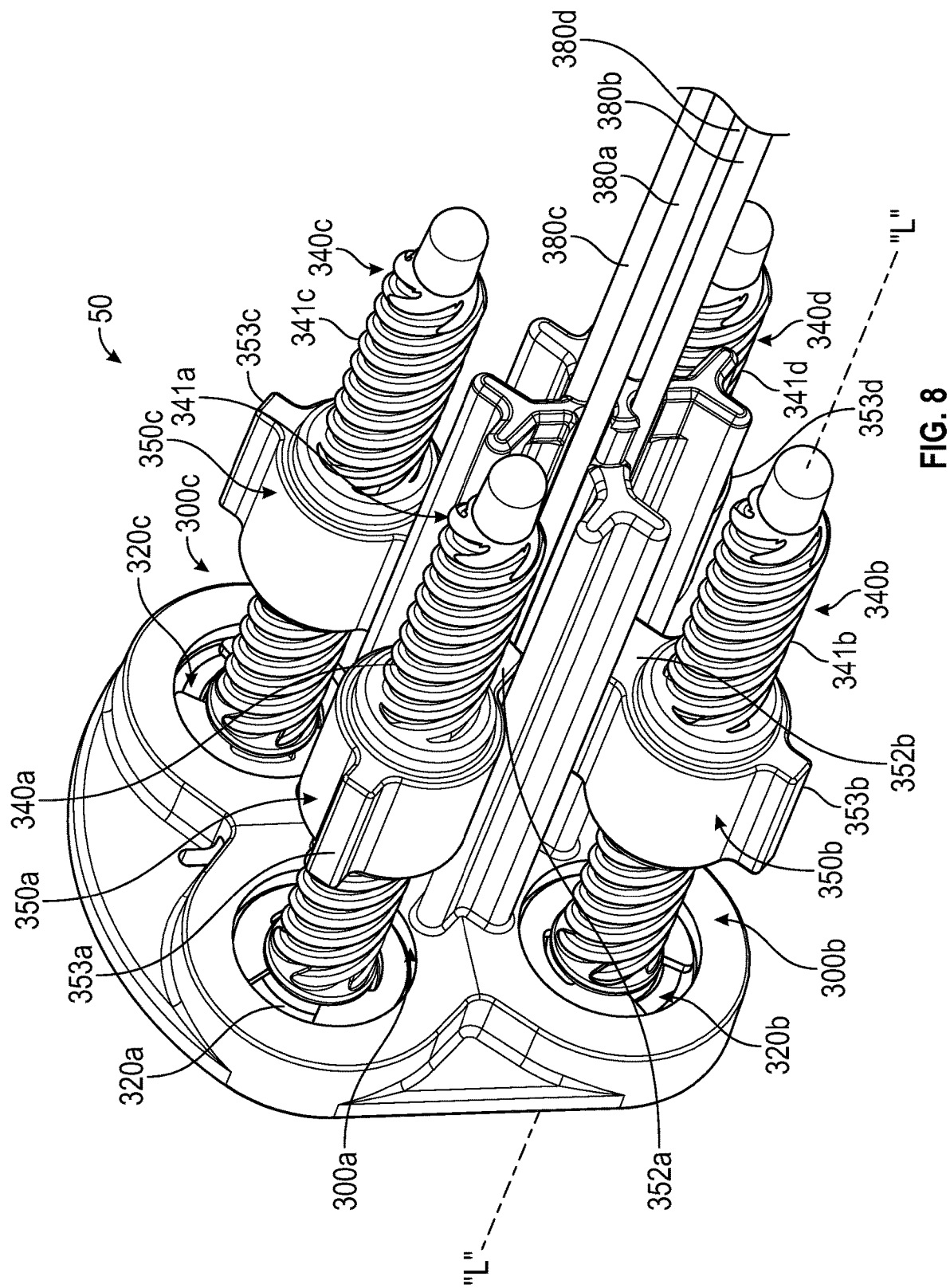
FIG. 8 is a perspective view of drive assemblies of the surgical instrument of FIG. 7.
Figure 9A:
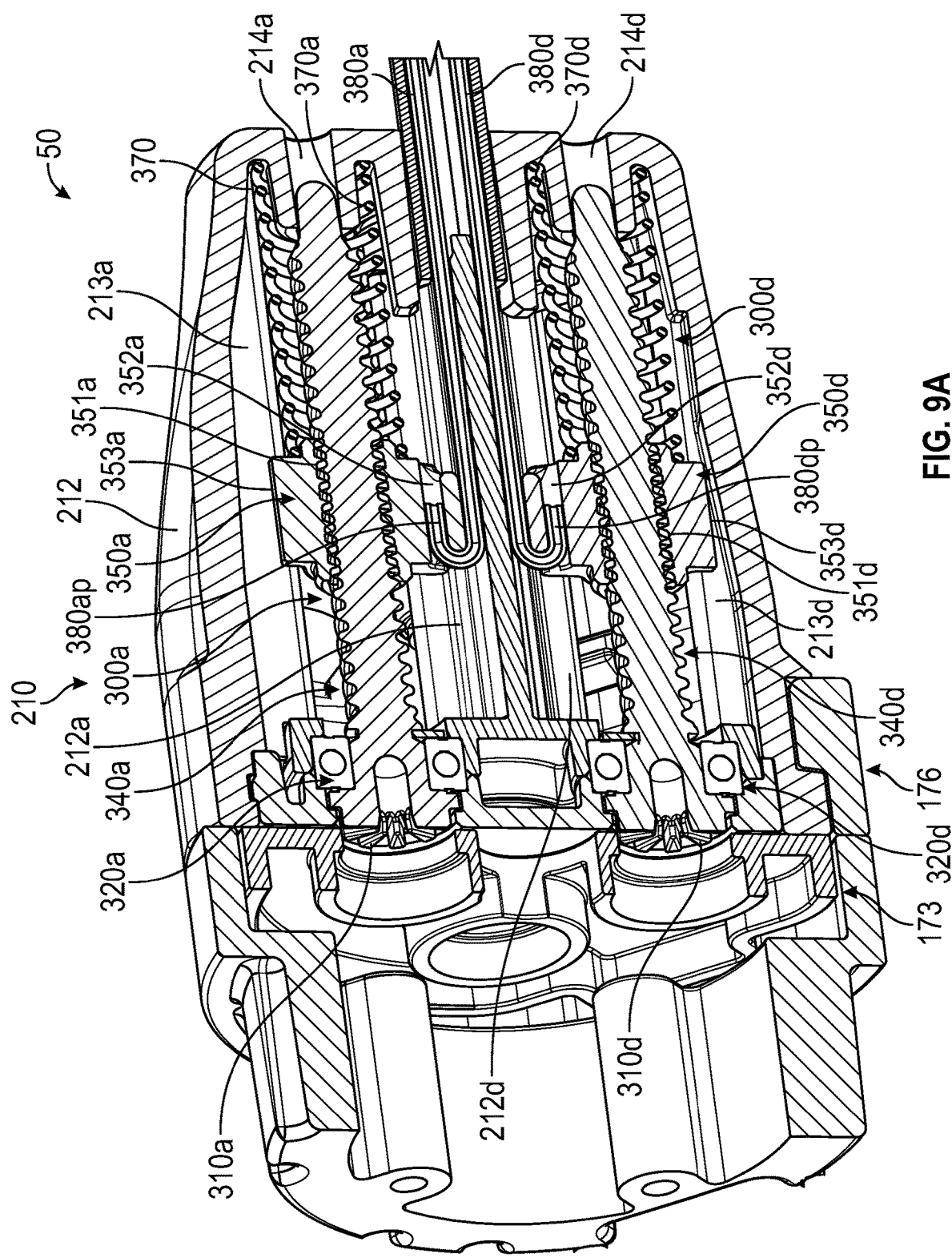
FIG. 9A is a cross-sectional view of the surgical instrument, as taken through 9A-9A of FIG. 7.
Figure 9B:
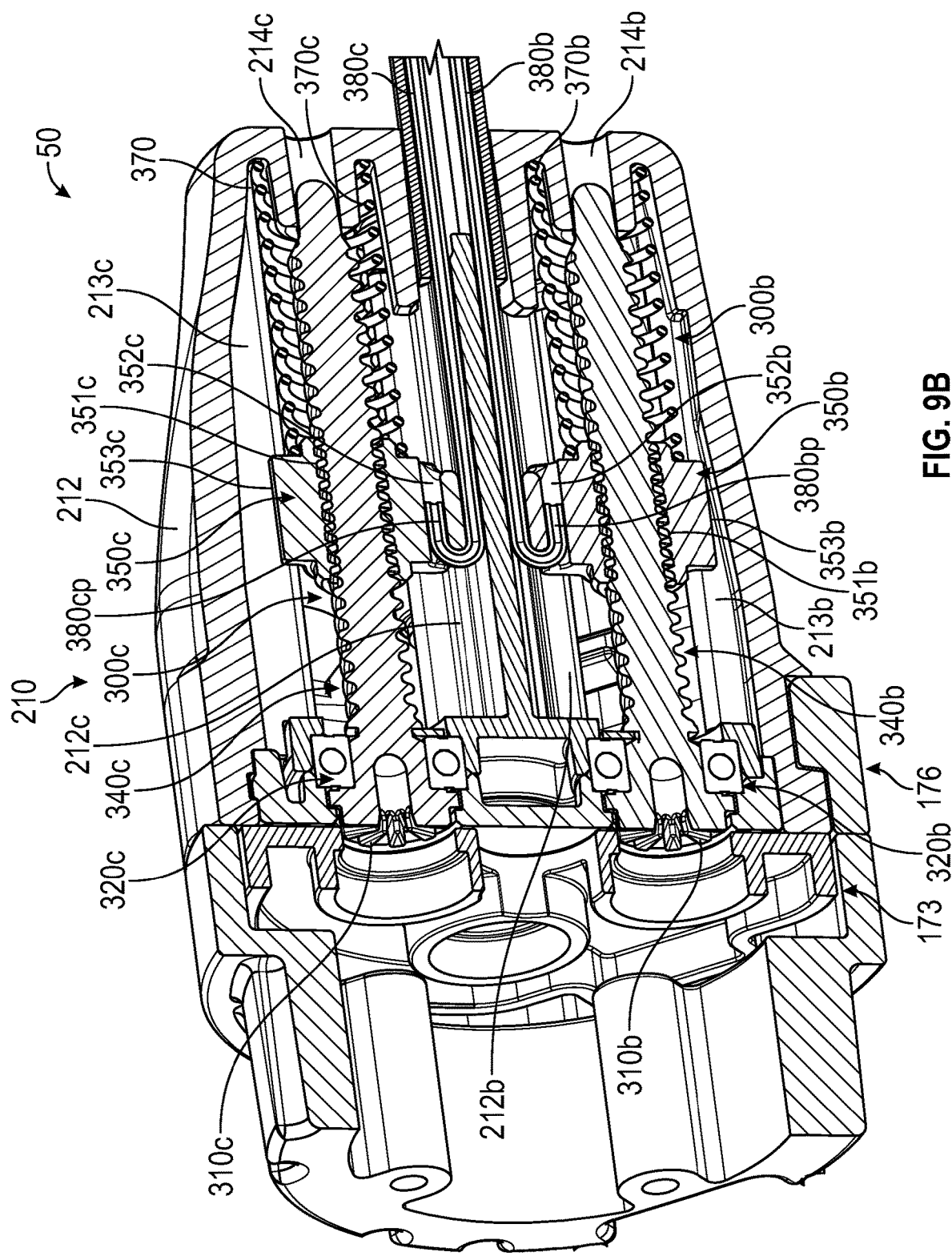
FIG. 9B is a cross-sectional view of the surgical instrument, as taken through 9B-9B of FIG. 7.

Each of the drive screws 340a, 340b, 340c, 340d includes a threaded body or shaft portion 341a, 341b, 341c, 341d and defines a longitudinal axis "L-L" extending through a radial center thereof (see FIG. 8). In use, rotation of the proximal coupler 310a, 310b, 310c, 310d as described above, results in rotation of a respective drive screw 340a, 340b, 340c, 340d about longitudinal axis "L-L", in a corresponding direction and rate of rotation.

Each of the drive nuts 350a, 350b, 350c, 350d includes a threaded aperture 351a, 351b, 351c, 351d extending longitudinally therethrough, which is configured to mechanically engage the threaded shaft portion 341a, 341b, 341c, 341d of a respective drive screw 340a, 340b, 340c, 340d. Each drive nut 350a, 350b, 350c, 350d is configured to be positioned on a respective drive screw 340a, 340b, 340c, 340d in a manner such that rotation of the drive screw 340a, 340b, 340c, 340d causes longitudinal movement or translation of the respective drive nut 350a, 350b, 350c, 350d. Moreover, rotation of the proximal coupler 310a, 310b, 310c, 310d in a first direction (e.g., clockwise) causes the respective drive nut 350a, 350b, 350c, 350d to move in a first longitudinal direction (e.g., proximally) along the respective drive screw 340a, 340b, 340c, 340d and rotation of the proximal coupler 310a, 310b, 310c, 310d in a second direction (e.g., counter-clockwise) causes the respective drive nut 350a, 350b, 350c, 350d to move in a second longitudinal direction (e.g., distally) with respect to the respective drive screw 340a, 340b, 340c, 340d.

Each drive nut 350a, 350b, 350c, 350d includes a retention pocket formed in an engagement tab 352a, 352b, 352c, 352d formed therein that is disposed adjacent the threaded aperture 351a, 351b, 351c, 351d thereof. Each retention pocket is configured to retain a proximal end portion 380ap, 380bp, 380cp, 380dp of a respective cable 380a, 380b, 380c, 380d, as discussed in further detail below.

Each drive nut 350a, 350c, 350c, 350d also includes a tab 353a, 353b, 353c, 353d extending radially from and longitudinally along an outer surface thereof. The tab 353a, 353b, 353c, 353d of each drive nut 350a, 350b, 350c, 350d is configured to be slidably disposed in a respective longitudinally extending channel 213a, 213b, 213c, 213d formed in the bores 212a, 212b, 212c, 212d of the housing 212. The tab 353a, 353b, 353c, 353d of each drive nut 350a, 350b, 350c, 350d cooperates with a respective channel 213a, 213b, 213c, 213d of the bore 212a, 212b, 212c, 212d of the housing 212 to inhibit or prevent each drive nut 350a, 350b, 350c, 350d from rotating about longitudinal axis "L-L" as each drive screw 340a, 340b, 340c, 340d is rotated.

The engagement tabs 352a, 352b, 352c, 352d of each of the drive nuts 350a, 350b, 350c, 350d includes is disposed adjacent a radially inward surface thereof, which is configured to mechanically engage or retain a proximal end portion 380ap, 380bp, 380cp, 380dp of a respective cable 380a, 380b, 380c, 380d. In operation, as the drive nuts 350a, 350b, 350c, 350d are axially displaced along the drive screw 340a, 340b, 340c, 340d, the drive nuts 350a, 350b, 350c, 350d transmit concomitant axial translation to the cable 380a, 380b, 380c, 380d.

The biasing elements 370a, 370b, 370c, 370d, which may be compression springs, are configured to radially surround a respective distal portion of the threaded shaft portion 341a, 341b, 341c, 341d of each drive screw 340a, 340b, 340c, 340d. Each biasing element 370a, 370b, 370c, 370d is interposed between a respective drive nut 350a, 350b, 350c, 350d and a distal surface of the housing 212 of the housing assembly 210.

Each cable 380a, 380b, 380c, 380d extends distally from a respective drive nut 350a, 350b, 350c, through a respective central bore or channel 212a, 212b, 212c, 212d of the housing 212 of the housing assembly 210, and is configured to mechanically engage a portion of a surgical instrument, e.g., a portion or component of end effector 200, of the instrument 50.

Figure 10:
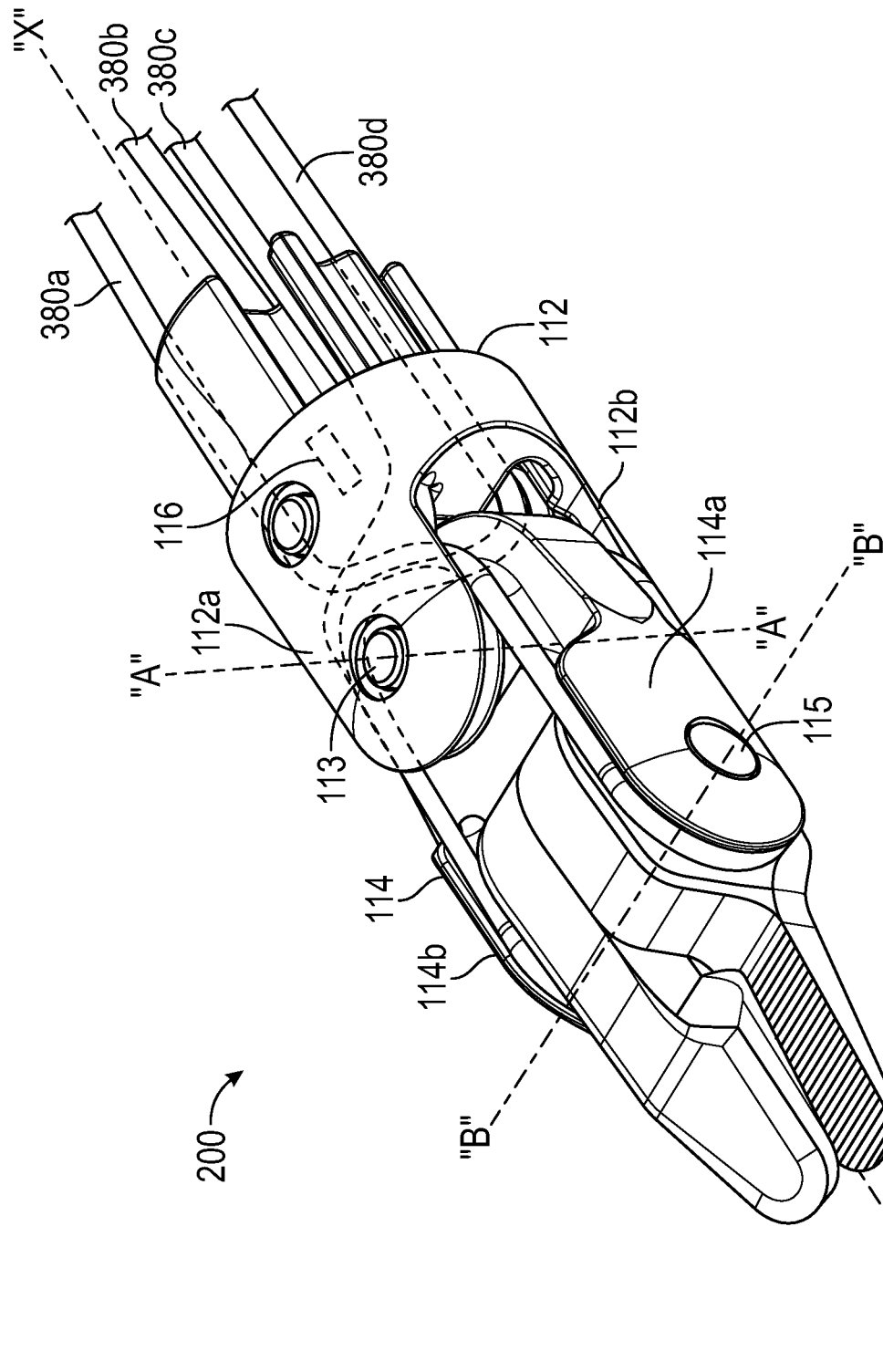
FIG. 10 is a top, perspective view of an end effector, according to an embodiment of the present disclosure, for use in the surgical robotic system of FIG. 1.

In operation, longitudinal translation of at least one cable 380a, 380b, 380c, 380d is configured to move and/or actuate the end effector 200 of the instrument 50 in a specific manner. With reference to FIG. 10, the end effector includes a proximal portion 112 having a first pin 113 and a distal portion 114. The distal portion 114 is pivotable about the pin 113, which defines an axis "A-A." The cables 380a, 380b, 380c, 380d are routed through proximal and distal portions 112 and 114 around their respective pulleys 112a, 112b, 114a, 114b, which are integrally formed as arms of the proximal and distal portions 112 and 114. In embodiments, the end effector 200, namely, the distal portion 114 and the jaws 120 and 122, may be articulated about the axis "A-A" to control a yaw angle of the end effector with respect to a longitudinal axis "X-X". The distal portion 114 includes a second pin 115 with a pair of jaws 120 and 122 pivotably coupled to the second pin 115. The jaws 120 and 122 configured to pivot about an axis "B-B" defined by the second pin 115 allowing for controlling a pitch angle of the jaws 120 and 122 as well as opening and closing the jaws 120 and 122. The yaw, pitch, and jaw angles are controlled by adjusting the tension and/or length and direction (e.g., proximal or distal) of the cables 380a, 380b, 380c, 380d. The end effector 200 also includes a cable displacement sensor 116 configured to measure position of the cables 380a, 380b, 380c, 380d. Thus, the end effector 200 has three degrees of freedom, yaw, pitch and jaw angle between jaws 120 and 122. In embodiments, the end effector 200 may have a plurality of cable displacement sensors 116, one for each of the cables 380a, 380b, 380c, 380d. The cable displacement sensor 116 is stationary and may operate by measuring a particular movable point on the cable 380a, 380b, 380c, 380d marked by a marker (e.g., magnet, dot, etc.). The cable displacement sensor 116 may be an optical encoder, a Hall Effect sensor, or any other suitable displacement sensor.

In accordance with the present disclosure, a distal portion of at least one of the cables 380a, 380b, 380c, 380d may include a flexible portion, while a proximal portion of the cables 380a, 380b, 380c, 380d may be rigid, such that the flexible distal portion may follow a particular path through the instrument 50. Accordingly, the biasing elements 370a, 370b, 370c, 370d may function to maintain the cables 380a, 380b, 380c, 380d in tension to prevent slack or to reduce the amount of slack in the flexible distal portion of the cables 380a, 380b, 380c, 380d. The motors 152a, 152b, 152c, 152d of the IDU 52 control the minimum tension on the cables 380a, 380b, 380c, 380d, such that the minimum tension is maintained by all four couplers 310a, 310b, 310c, 310d.

During use of the instrument 50 (e.g., when motor 152a, 152b, 152c, 152d of the IDU 52, or other powered drives, are used to rotate one or more of proximal couplers 310a, 310b, 310c, 310d), rotation of a proximal coupler 310a, 310b, 310c, 310d results in a corresponding rotation of the respective drive screw 340a, 340b, 340c, 340d. Rotation of the drive screw 340a, 340b, 340c, 340d causes longitudinal translation of the respective drive nut 350a, 350b, 350c, 350d due to the engagement between the threaded portion 341a, 341b, 341c, 341d of the drive screw 340a, 340b, 340c, 340d and the threaded aperture 351a, 351b, 351c, 351d of the drive nut 350a, 350b, 350c, 350d.

The direction of longitudinal translation of the drive nut 350a, 350b, 350c, 350d is determined by the direction of rotation of the proximal coupler 310a, 310b, 310c, 310d, which in turn, rotate the respective drive screws 340a, 340b, 340c, 340d. In embodiments, clockwise rotation of each of the drive screws 340a, 340b, 340c, 340d results in a corresponding proximal translation of cable 380a, 380b, 380c, 380d. Additionally, counterclockwise rotation of each of the drive screws 340a, 340b, 340c, 340d results in a corresponding distal translation of cables 380a, 380b, 380c, 380d.

Additionally, in one aspect, when one drive nut 350a, 350b, 350c, 350d of one of the drive assemblies 300a, 300b, 300c, 300d moves in a first longitudinal direction (e.g., proximally), it is envisioned that a different drive nut 350a, 350b, 350c, 350d from a different drive assembly 300a, 300b, 300c, 300d is moved in a second, opposite longitudinal direction (e.g., distally). Such a function may be accomplished by controlling the respective motors 152a, 152b, 152c, 152d. Such configurations function to, for example, compensate for any slack in the cables 380a, 380b, 380c, 380d or to create a slack in cables 380a, 380b, 380c, 380d. It is contemplated that each drive nut 350a, 350b, 350c, 350d may be independently driven.

Each of the motors 152a, 152b, 152c, 152d may be controlled in a corresponding manner to negate slack formation in any of cables 380a, 380b, 380c, 380d when another one of cables 380a, 380b, 380c, 380d (e.g., an opposing cable) is translated in an opposing direction. Additionally, each of the motors 152a, 152b, 152c, 152d may be controlled in a corresponding manner to create slack in any of the cables 380a, 380b, 380c, 380d when another one of cables 380a, 380b, 380c, 380d (e.g., an opposing cable) is translated in an opposing direction. Such corresponding control of the motors 152a, 152b, 152c, 152d ensures that the proximal translation of any of cables 380a, 380b, 380c, 380d is not hindered by the stationary position of an opposing cable 380a, 380b, 380c, 380d.

With reference to FIG. 6, each of the motors 152a, 152b, 152c, 152d includes a current sensor 153, a torque sensor 155, and an encoder 157. For conciseness only operation of the motor 152a is described below. The sensors 153, 155, 157 monitor the performance of the motor 152a. The current sensor 153 is configured to measure the current draw of the motor 152a and the torque sensor 155 is configured to measure motor torque. The torque sensor 155 may be any force or strain sensor including one or more strain gauges configured to convert mechanical forces and/or strain into a sensor signal indicative of the torque output by the motor 152a. The encoder 157 may be any device that provides a sensor signal indicative of the number of rotations of the motor 152a, such as a mechanical encoder or an optical encoder. Parameters which are measured and/or determined by the encoder 157 may include speed, distance, revolutions per minute, position, and the like. The sensor signals from sensors 153, 155, 157 are transmitted to the IDU controller 41d, which then controls the motors 152a, 152b, 152c, 152d based on the sensor signals. In particular, the motors 152a, 152b, 152c, 152d are controlled by an actuator controller 159, which controls torque outputted and angular velocity of the motors 152a, 152b, 152c, 152d. In embodiments, additional position sensors may also be used, which include, but are not limited to, potentiometers coupled to movable components and configured to detect travel distances, Hall Effect sensors, accelerometers, and gyroscopes. In embodiments, a single controller can perform the functionality of the IDU controller 41d and the actuator controller 159.

The IDU controller 41d provides inputs and process outputs to/from the IDU 52 during calibration and joint motion. The input signals include the desired state, desired joint angles, actual motor states, actual motor angles, actual motor current. The output signals include actual controller state, actual joint angles, desired motor state, desired motor torque, and joint limits.

Figure 11:
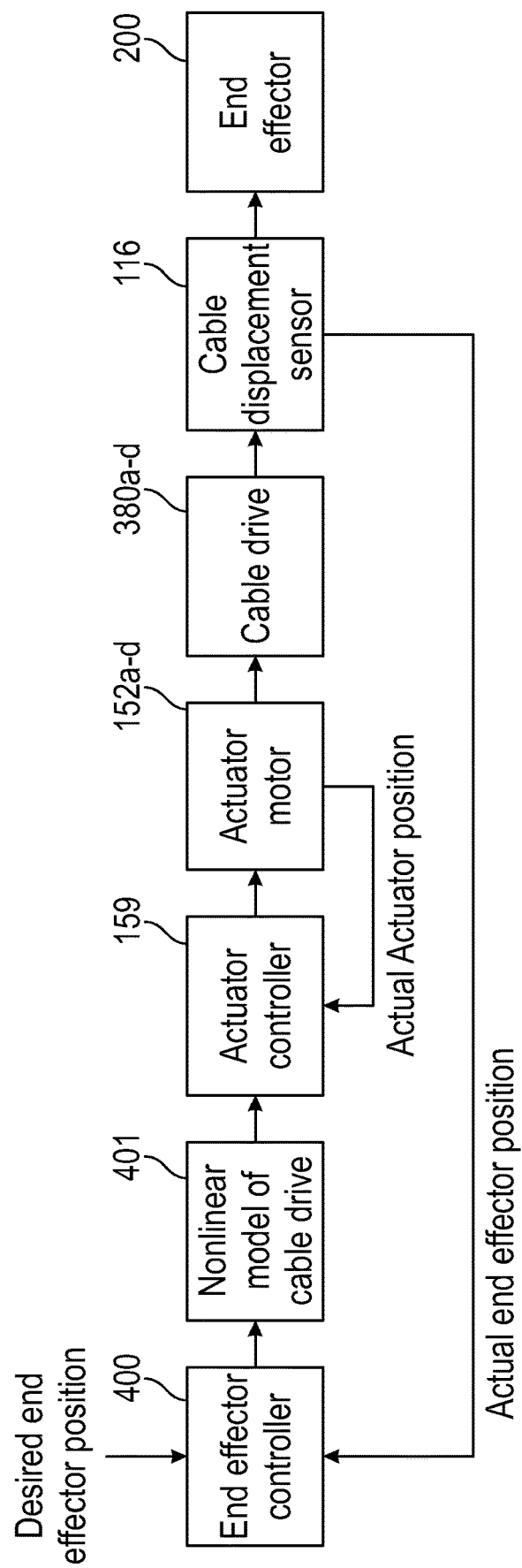
FIG. 11 is a flow control diagram of components controlling position of the end effector of FIG. 10 according to an embodiment of the present disclosure.

The IDU controller 41d is responsible for calibrating the instrument 40, including each of the cables 380a, 380b, 380c, 380d. With reference to FIG. 11, an end effector position controller 400 controls the movement of the end effector 200 using an open loop control scheme in which the final position of the end effector 200 (e.g., output) is not used in its control, rather feedback is provided by the cable displacement sensor 116 and the encoder 157. The end effector position controller 400 may be a separate controller coupled to the IDU controller 41d and may be disposed within the IDU 52 or the end effector position controller 400 may be a component of the IDU controller 41d. A desired position for the end effector 200 is generated in response to user input through the handle controllers 38a and 38b and/or automated motion profile. The desired position is provided to the position controller 400 and is compared with the actual position of the end effector 200 as measured by the cable displacement sensor 116. The position controller 400 computes a position error and additional control signals that are inputs to a nonlinear model 401 of the cables 380a, 380b, 380c, 380d. The model 401 determines a desired displacement of the proximal end of the cables 380a, 380b, 380c, 380d for overcoming nonlinearities such as backlash, cable stretch, stiction, and changes in length of the cable path due to bending.

Position control for instrument 50, including standard graspers, needle drivers, and bipolar instruments includes gain scheduling such that the position feedback for jaw control is disengaged when a jaw clamp is performed with a commanded input of full jaw close. This ensures that integral windup is prevented when the jaws 120 and 122 are not closed due to the object being grasped and switches the integral off until the clamp force is released and a jaw open action takes place after having transitioned from the high static friction region which results from higher jaw torques under clamp.

Position control also includes a dithering routine which maintains the instrument joints (i.e., proximal portion 112 and distal portion 114) in a dynamic friction region. As used herein, "dithering" denotes oscillating movement in opposing direction at a frequency rate of from about 40 Hz to about 150 Hz. Dithering is implemented in joint space and may be optimized based on empirical testing of a population of instruments 50 to account for instrument-to-instrument variation as well as variation over the life of the instrument 50. Joint space dithering is based on the wrist pose of the instrument 50 and configuration dependent friction. Dithering breaks away the proximal portion 112 and distal portion 114 from the static friction region and improves the controller response. Dithering also reduces the net torque needed for articulation, thereby prolonging the life of the instrument 50.

In embodiments, where the instrument 50 is a shears instrument, position control routine includes a feedforward friction model. This feedforward model reduces the controller effort of the feedback position loop and helps with controller stability and response by compensating for high friction, that is required and intrinsic to the blades design of the shears instrument jaws for adequate cutting performance.

The model 401 greatly improves the performance position control of the end effector because the model 401 compensates for the nonlinearities and allows a linear feedback controller, i.e., the actuator controller 159, to be used. Otherwise, closing the feedback loop without using the model 401 would result in a slow response, inaccuracies, and significant variation in performance as the flexible cables 380a, 380b, 380c, 380d change shape. The model 401 also compensates for variances in actual position of the jaws 120 and 122 of the surgical instrument due to the cable wrap on the pulleys 112a, 112b, 114a, 114b (FIG. 10).

The desired displacement calculated by the model 401 is then used as an input to the actuator controller 159 which computes commanded movement commands (e.g., amount of current supplied) for each of the motors 152a, 152b, 152c, 152d. The actuator controller 159 also acts as a position controller using a feedback loop from the actual position of the motors 152a, 152b, 152c, 152d measured by the respective encoder 157. The actual motor position is compared with the desired motor position from the model 401 to further refine motor control. The motors 152a, 152b, 152c, 152d are connected to the couplers 310a, 310b, 310c, 310d that pull on the cables 380a, 380b, 380c, 380d that transmits the motion to end effector 200. The cable displacement sensor 116 measures the actual position of each of the cables the cables 380a, 380b, 380c, 380d, which corresponds to the actual end effector position 200.

In embodiments, the video feed from the endoscopic camera 51 may also be used to provide an additional control parameter to the feedback loop using vision-based algorithms, e.g., detecting movement and/or angle of the end effector 200, and providing the visually observed angle to the position controller 400. Vision-based algorithms may be used alternatively or in addition to the feedback provided by the cable displacement sensor 116 to monitor actual position of the end effector 200. Additionally, measured cable tension may also be used as an additional input to the position controller 400. Measured torque may be used to estimate applied forces and torque on the tissue by the end effector 200.

In further embodiments, the model 401 may be an adaptive nonlinear model of the cables 380a, 380b, 380c, 380d that automatically adjusts control parameters to compensate for observable parameters that slowly change over time, such as overall curvature changes of the flexible cable conduit. A neural network or other artificial intelligence-based algorithms may be used to develop and implement the nonlinear model 401. The model 401 may be taught based on a data set of commanded motions and observed (i.e., measured) positions of the end effector 200.

Figure 12:
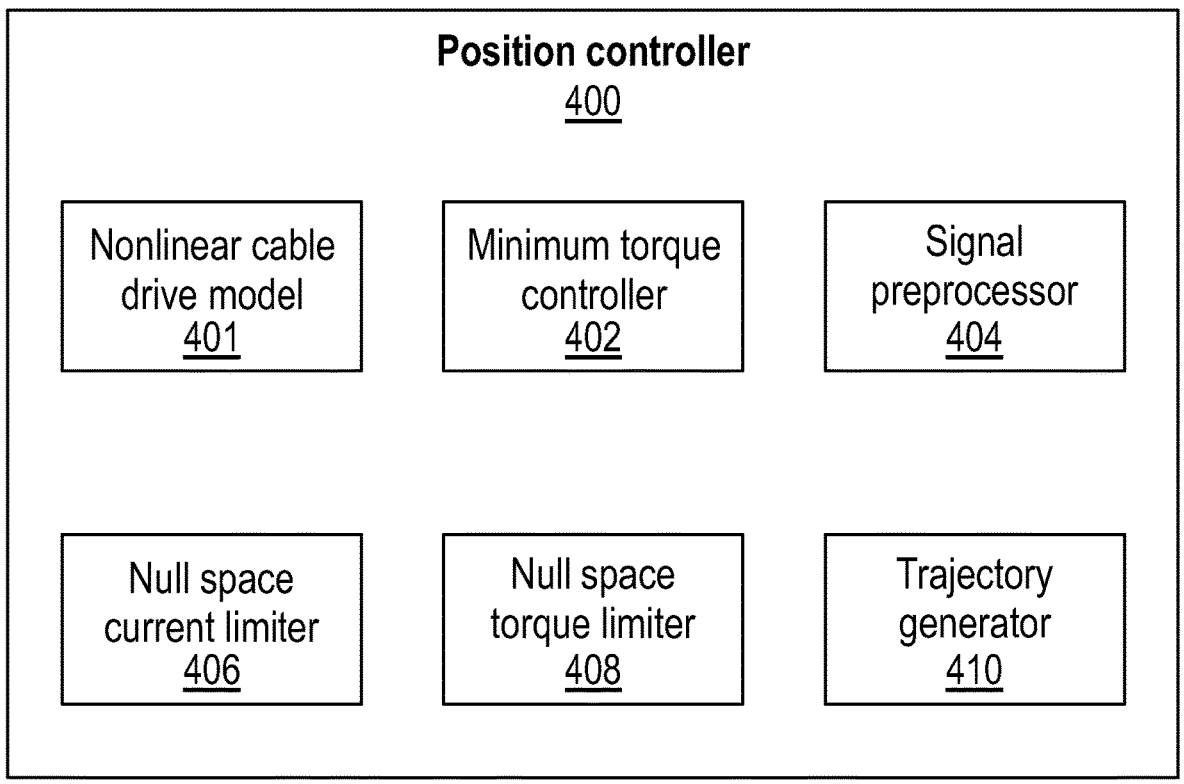
FIG. 12 is a schematic diagram of an end effector position controller according to an embodiment of the present disclosure.
Figure 13:
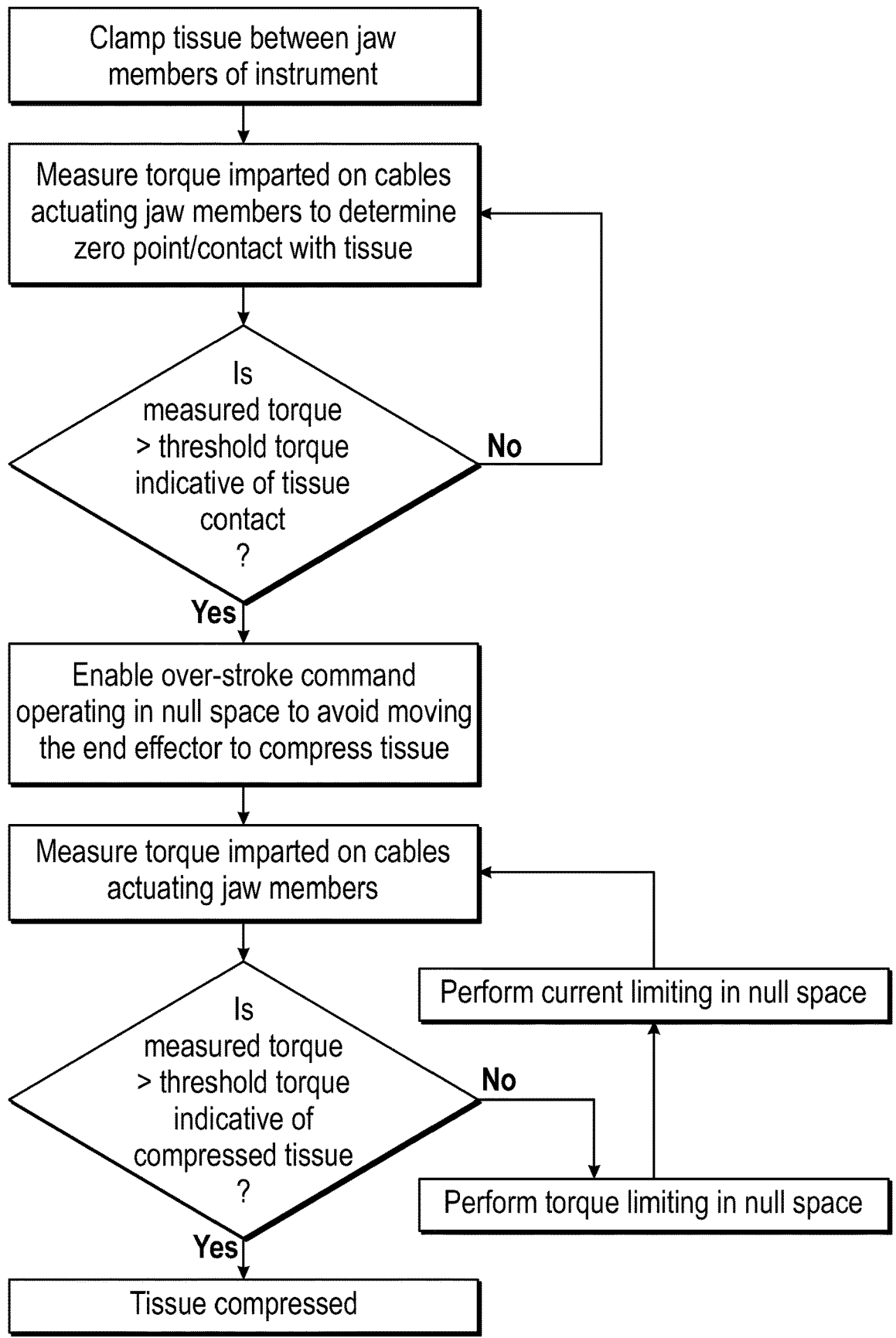
FIG. 13 is a flow chart of a method for controlling jaw clamping of the end effector of FIG. 10 according to an embodiment of the present disclosure.
Figure 14:
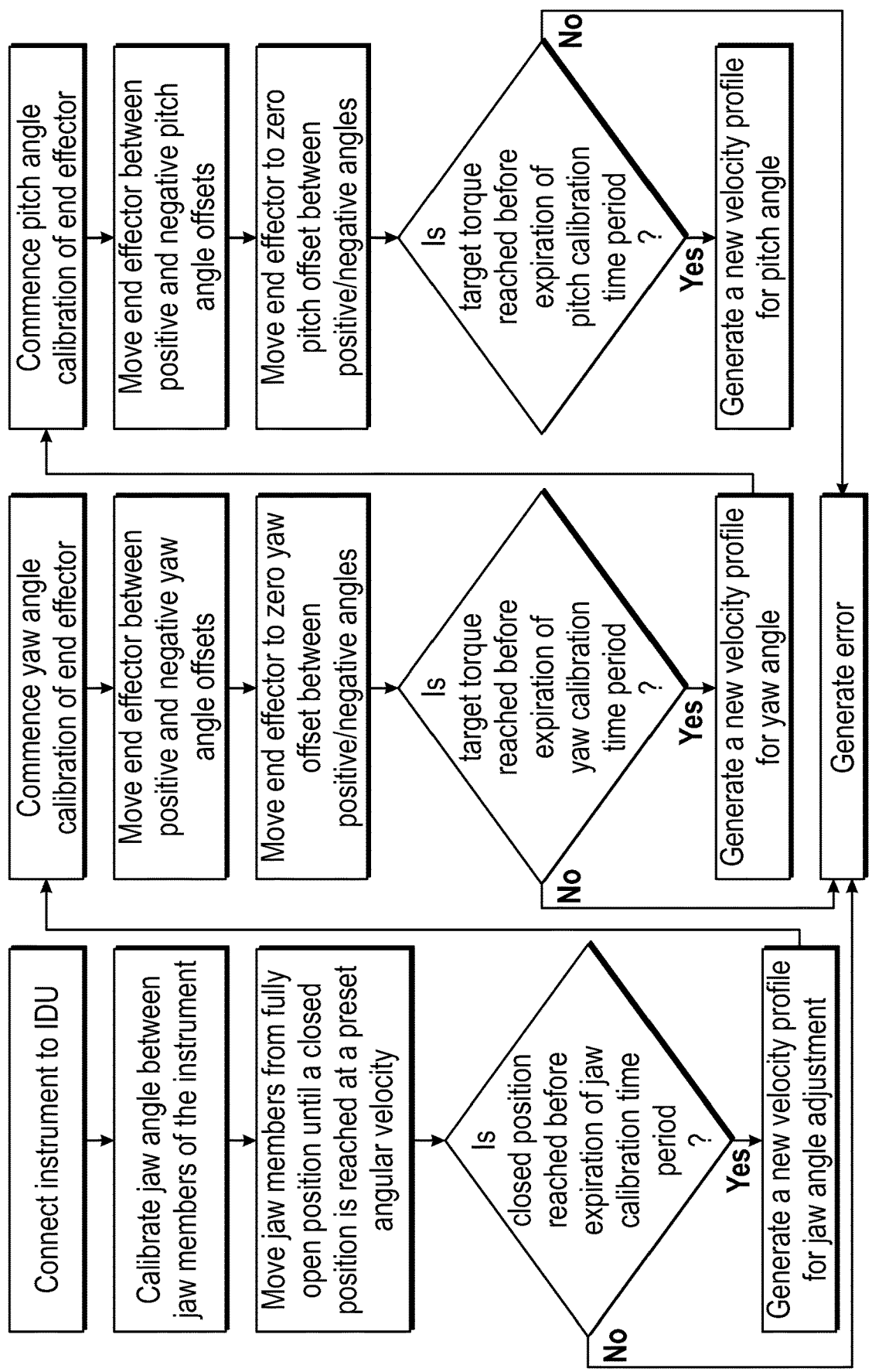
FIG. 14 is a flow chart of a method for calibration the instrument drive unit and the surgical instrument of FIG. 5 according to an embodiment of the present disclosure.

With reference to FIG. 12, the position controller 400 receives position commands for the end effector 200 and calculates individual position for the motors 152a, 152b, 152c, 152d. In particular, the position controller 400 transforms the desired joint angles of the end effector 200 into motor currents to achieve the desired position. The position controller 400 also includes a minimum torque controller 402, which maintains cable tension while controlling the yaw, pitch and jaw angles. Thus, the minimum torque controller 402 is used to transform the desired joint angles of the instrument 50 into motor currents supplied to the motors 152a, 152b, 152c, 152d while ensuring that minimum torque on the cables 380a, 380b, 380c, 380d is applied by the motors 152a, 152b, 152c, 152d to maintain the desired position. The minimum torque controller 402 is also configured to compensate for the clamping force of the jaws 120 and 122 as a function of the yaw/pitch of the end effector 200 and/or the jaws 120 and 122. The position controller 400 and the minimum torque controller 402 may be embodied as software applications executed by the IDU controller 41d.

The main function of the minimum torque controller 402 is to ensure a minimum tension is maintained on all the cables 380a, 380b, 380c, 380d at all times. This is achieved by a minimum torque controller feedback loop which runs in parallel to the position controller 400. The minimum torque controller 402 controller is limited at 1 Hz bandwidth to allow for transient errors in minimum torque on the cables 380a, 380b, 380c, 380d to reduces the overall system stiffness, improves controller response to high acceleration position commands and add stability margin to the position controller 400 by slowing the direct torque control dynamics.

Figure 17:
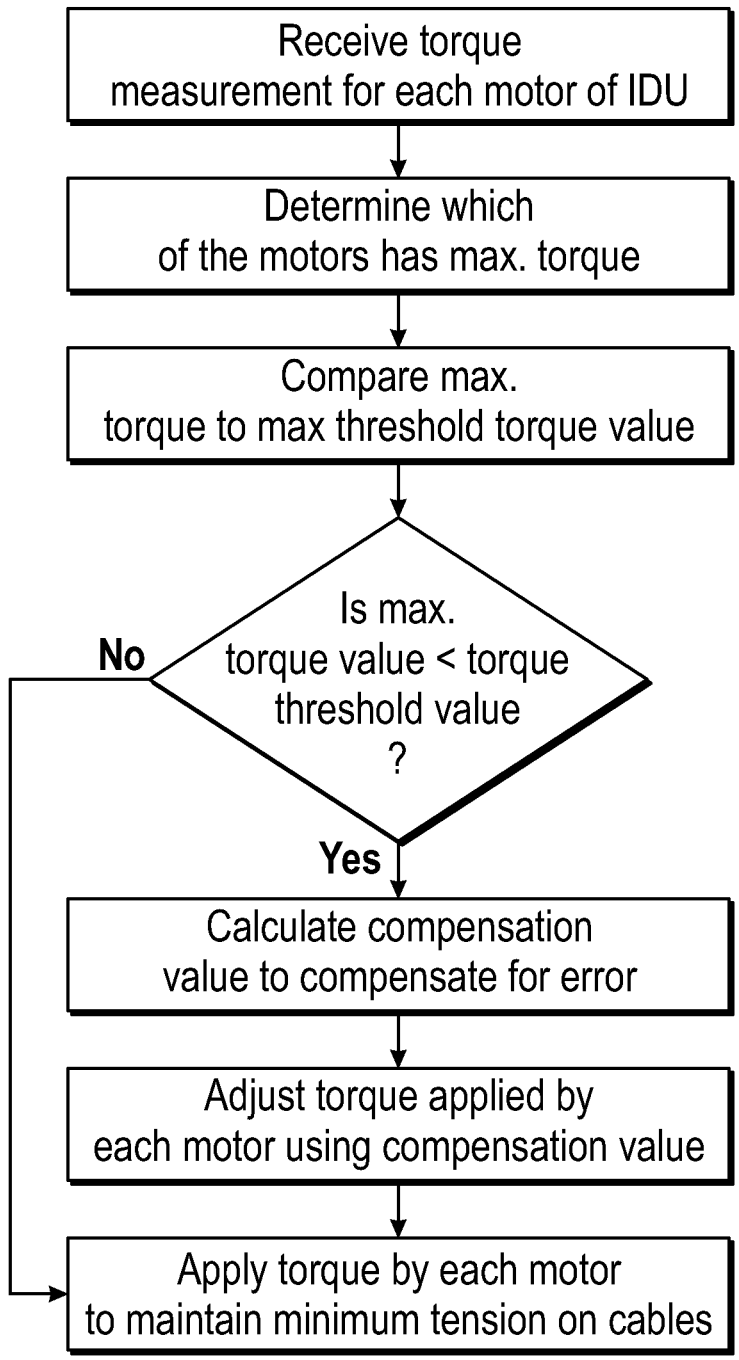
FIG. 17 is a flow chart of a method for minimum torque control of the motors of the instrument drive unit according to an embodiment of the present disclosure.

With reference to FIG. 17, the minimum torque controller 402 is configured to determine a difference between the torque output of the motors 152a, 152b, 152c, 152d and to make adjustments to all four of the motors 152a, 152b, 152c, 152d based on a difference between the individual torque measurements. In particular, the minimum torque controller 402 operates by determining which of the measured torque values is the largest. The minimum torque controller 402 receives the measured torque from torque sensors 155 of each of the motors 152a, 152b, 152c, 152d and compares the torque values to determine the maximum torque value of the four values. Maximum torque indicates lowest tension, whereas higher tension corresponds to a higher negative torque. The minimum torque controller 402 compares the determined maximum torque value to a threshold torque value, which may be empirically obtained based on mechanical properties of the instrument 50. If this determined maximum torque value is below the threshold torque value, the minimum torque controller 402 calculates a compensation value, which is applied for the error, i.e., maximum torque value, to each of the motors 152a, 152b, 152c, 152d such that position of the end effector 200 is not disturbed. This compensation happens in the null-space of the position controller 400.

The position controller 400 operates a control space, which defines commands that impart movement of the end effector 200 and a null space, which defines commands that do not impart spatial movement on the end effector 200 (e.g., proximal and distal portions 112 and 114). The position controller 400 is configured to adjust jaw clamp force, which is added in the null space of the position controller 400.

Position controller 400 controls movement of jaws 120 and 122 to clamp tissue and utilizes over-stroke processing to achieve jaw clamp force, jaw clamp feedback to maintain consistent clamp force, current and torque limiters to ensure the current and torque remain within predetermined limits. This may be accomplished by utilizing an over-stroke mode, which drives the two jaws 120 and 122 past a zero point in order to generate sufficient jaw clamp force. A zero point is reached once the jaws 120 and 122 contact the tissue based on measured torque. The over-stroke mode is implemented in the null space of the position controller 400 such that the addition of over-stroke mode does not affect the position control command. This is accomplished by increasing the tension applied by each set of the cables 380a, 380b and 380c, 380d in equal amounts but in different directions resulting in net zero movement while increasing the pressure therebetween. Motion of the end effector 200 is accomplished when tension in one or more of the cables (e.g., cables 380a, 380b) exceeds the tension in the remaining cables (e.g., cables 380c, 380d). Thus, when there is a net difference between the two tensions of subsets of cables 380a, 380b, 380c, 380d the end effector 200 is actuated. As the same force is either added or removed from both sets of cables 380a, 380b and 380c, 380d the net movement is zero. The same analysis applies for individual cables as well.

The over-stroke mode may apply pressure at a predetermined rate and uses two different rates for clamping and unclamping. The clamping rate is less than the unclamping rate in order to reduce current demand on the motors 152a, 152b, 152c, 152d. The unclamping rate is higher than the clamping rate as during this process the cables 380a, 380b, 380c, 380d are released, and result in less current draw. The over-stroke mode may also be configurable based on instrument type, with certain types of instruments requiring specific clamping pressures, e.g., due to jaw size.

As noted above, for instrument 50, e.g., graspers, needle drivers, and bipolar instruments, an over-stroke mechanism is used to generate jaw clamp force in the null space of the controller. The two low side cables, cables 380c and 380d (FIG. 10), are commanded an additional torque to achieve the rated clamp force for a given instrument when the instrument is commanded a full close at a jaw position at zero point.

In embodiments where the instrument 50 is a shears instrument, since there is no clamping, but rather a cutting action, the over-stroke command is designed to provide addition torque needed to make a clean and fast cut of the intended tissue or suture. In this case, the over-stroke command operates as a function of the commanded input angle such that the over-stroke torque is ramped up exponentially as the shears is driven to full close. The exponential ramp up is due to the increase in friction as the blades progress from an edge to edge constant to a surface over surface contact when the jaws 120 and 122 drive to complete close to finish the cutting action. During this jaw actuation, if the input command is stalled or driven to open the jaws 120 and 122, the over-stroke torque is discharged quickly to regain responsiveness of the open action and also to reduce net torque in the instrument when a cutting action is completed or paused.

The over-stroke torque is applied in series with the position controller 400 to provide additional torque based on the requirement for the situations requiring maximum torque application, e.g., large size sutures. This added torque, on top of the torque needed for a successful jaw actuation, ensures a cut can be made in any articulated configuration of the shears instrument 50.

The IDU controller 41d also includes a null space current limiter 406, which performs motor current limiting of each of the motors 152a, 152b, 152c, 152d within the null space of the position controller 400. Null space current limiting has only minor or no impact on jaw clamp and joint trajectory tracking of the joints of the end effector 200 (e.g., proximal and distal portions 112 and 114). During null space current limiting, absolute maximum of the current supplied to each of the motors 152a, 152b, 152c, 152d is calculated to obtain a current value. This value is then inverted in order to calculate a scaling factor to be applied in the null space of the position controller 400. If the scaling factor is less than one, the current value is applied across all four motors 152a, 152b, 152c, 152d. The saturation state and scaling value are used in the position feedback loop to prevent integrator windup of a PID controller of the position controller 400.

The IDU controller 41d also includes null space torque limiter 408 which performs motor torque limiting of each of the motors 152a, 152b, 152c, 152d within the null space of the position controller 400. Null space target limiting has only minor or no impact on jaw clamp and joint trajectory tracking of the joints of the end effector 200 (e.g., proximal and distal portions 112 and 114). There is a dead band between when the torque limiter 408 is engaged and the absolute torque limit to give the position controller 400 enough time to affect the torque during clamped movement of the jaws 120 and 122. The absolute maximum of the torque is calculated to obtain a torque value. This value is then inverted to calculate the scaling factor to be applied in the null space of the controller. If the scaling factor is less than one, the torque value is applied across all four motors 152a, 152b, 152c, 152d. The saturation state and scaling value are used in the position feedback loop (FIG. 11) to prevent integrator windup of a PID controller of the position controller 400.

Figure 15:
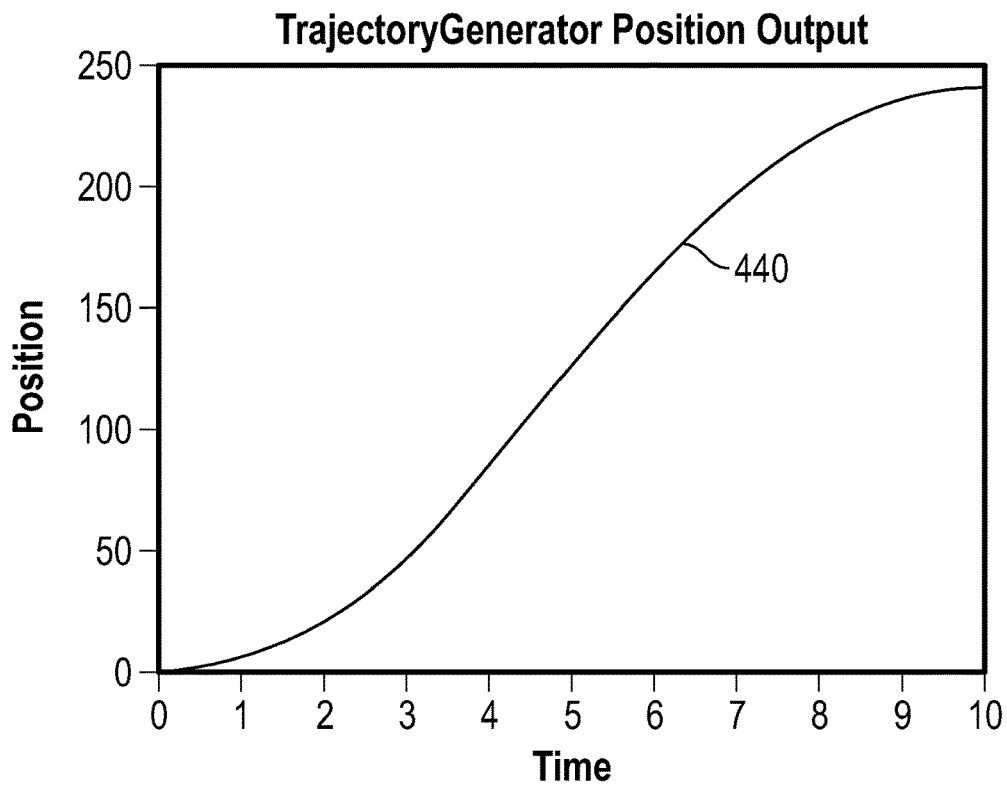
FIG. 15 is a plot trajectory of position over time for controlling position of the end effector of FIG. 10 according to an embodiment of the present disclosure.
Figure 16:
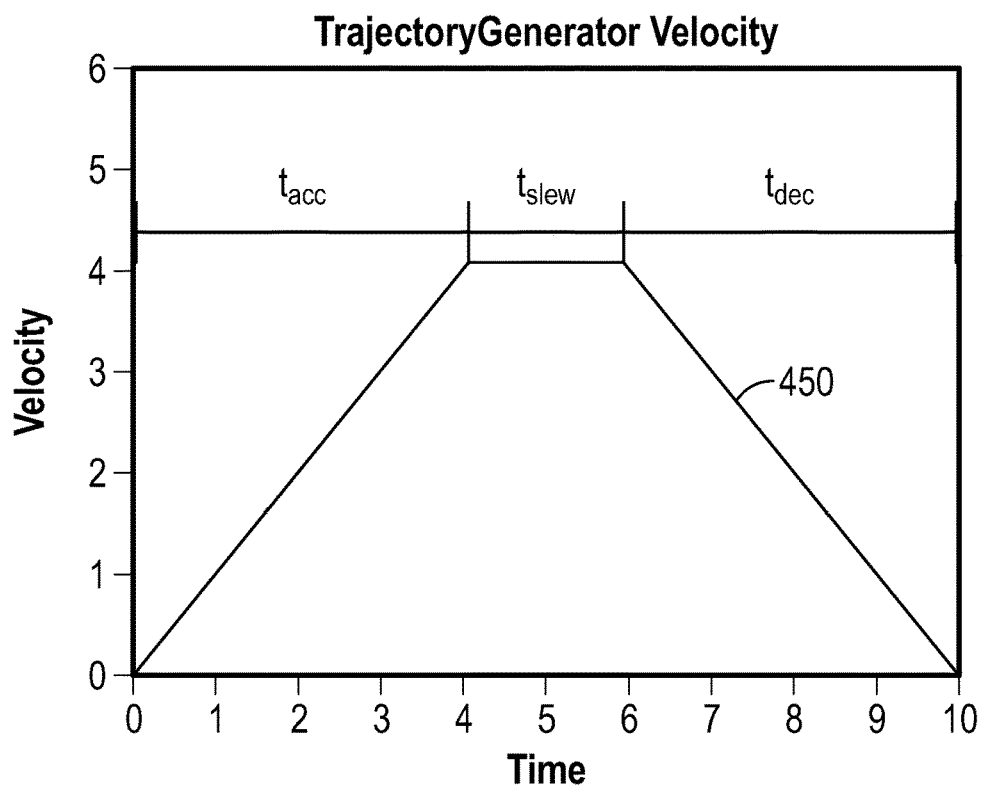
FIG. 16 is a plot trajectory of velocity over time for controlling velocity of the end effector of FIG. 10 according to an embodiment of the present disclosure.

The position controller 400 includes a trajectory generator 410, which outputs a position and the time at which the maneuver will be complete based on a position trajectory 440 (FIG. 15) and a trapezoidal velocity profile 450 (FIG. 16), which are updated during calibration with the following inputs: initial position, final position, desired acceleration, target velocity, desired deceleration, and time. There are three zones created by the velocity profile 450, the acceleration zone 450a, the constant velocity zone 450b, and the deceleration zone 450c as shown in FIG. 15.

The IDU controller 41d controls the wristed end effector 200 with differential drive by adjusting tension and/or distance of each of the cables 380a, 380b, 380c, 380d to achieve a desired pose of the end effector 200 (e.g., pitch, yaw, jaw angle). A minimum torque is provided to ensure the proper tension and is continuously applied to the four cables 380a, 380b, 380c, 380d, so the cables do not slack. If proper tension is not maintained on the cables, control of the end effector 200 will be lost.

Upon coupling the instrument 40 to the IDU 52, the IDU controller 41d performs calibration steps to ensure proper instrument zeroing of the joint angles in yaw, pitch and between jaws 120 and 122. The IDU controller 41d also performs inverse kinematics to control the attached wristed instrument 40 during position control. Calibration is performed on the yaw, pitch and jaw joint angles as well as initial engagement of couplers 310a, 310b, 310c, 310d and pre-tensioning the cables 380a, 380b, 380c, 380d. Thus, calibration is performed for each degree of freedom of the end effector 200.

The coupler engagement aligns the transfer shafts 154a, 154b, 154c, 154d of the IDU 52 with the couplers 310a, 310b, 310c, 310d of the attached instrument 50. Trapezoidal velocity profiles 450 are generated for each calibration step based on a given start and end position of each of the motors 152a, 152b, 152c, 152d. The trapezoidal velocity profile 450 includes velocity, acceleration, and deceleration values, using the trajectory generator 410. The target end stop for the yaw and pitch calibration is adjusted based on the orientation of the instrument 50. The contribution of the orientation adjustment is aligned with the current orientation of the end effector 20 with respect to a port latch of the endoscopic port 55. Once the calibration steps are complete the IDU controller 41d transitions to joint control. The calibration steps are described below in order of execution.

Jaw calibration closes the jaws 120 and 122 to find a zero point of the jaw joint angle corresponding to the closed position of the jaws 120 and 122. During jaw calibration, the jaws 120 and 122 are moved from a fully open position to a fully closed position. During jaw angle calibration, a jaw close trajectory is used, which sets a target angular velocity to be from about 1 radian per second (rad/s) to about 5 rad/s. The actual velocity of the jaws 120 and 122 during calibration is monitored until a desired (i.e., closed) position is reached.

The actual velocity is calculated by numerically differentiating the actual position measurements from the encoder 157 and applying a low pass filter to remove any noise generated from the velocity calculation.

There is a dead zone implemented that enables the calibration completion check once desired jaw position has been reached. The dead zone is used to ensure that the velocity limit does not erroneously trigger at the start of movement before the jaws 120 and 122 are completely closed. Once the velocity of both drive cables (e.g., cables 380a and 380b) has fallen below a threshold, which is product of a velocity limit, rotation steps, and a time period (e.g., about 0.00025 seconds) the jaw calibration is marked complete. Once the calibration is complete, the torque generated is released and the motor and joint angles are zeroed. If the end time of the ramp trajectory, which may also include an additional offset time value (e.g., 5 ms), has elapsed before the terminal velocity is detected, the calibration step fails and the IDU controller 52 transitions to an exception (i.e., outputting an error).

The yaw and pitch calibration process is a three-step calibration. First a positive joint trajectory is commanded until the target positive torque limits are detected for the instrument 50 at which point a starting offset value is recorded. Next a negative joint angle is commanded until the negative joint target torque limit is detected. A zero offset is then determined by calculating an average of the current offset value and starting offset value. The third and final joint calibration step is to move to the zero offset and zero the motor (e.g., one of the motors 152a, 152b, 152c, 152d being calibrated) and zero the joint angles of the end effector 200. This establishes a zero point for the joint angle. If during the three calibration steps end time of the ramp trajectory, which may also include an additional offset time value (e.g., 5 ms), elapses without achieving the target torque, the calibration step fails and the IDU controller 52 transitions to an exception (i.e., outputting an error). Each calibration step has a unique complete signal which is used to transition the state machine to the next calibration step.

The position controller 400 also includes a signal preprocessor 404, which provides input latching and caching as well as jaw angle scaling. Latching is provided for the motor angles and jaw offset, which are used by the IDU controller 41d during instrument calibration. Caching of the previous desired joint angles is also provided when in joint control to provide the previous position data for joint control hold. The input jaw angle is provided as a normalized jaw value from 0.0 to 1.0. The normalized value is then scaled by the preprocessor 404 from 0.0 to the maximum jaw angle value of 1.0 for the specific instrument in radians.

The position control consists of the minimum torque feedback control, the over-stroke processing, the current and torque limiters and the jaw clamp feedback loop. The minimum torque control provides the position control loop as well as maintaining tension on the cables 380a, 380b, 380c, 380d. The over-stroke processing applies torque to drive the jaws 120 and 122 together to reach the target clamp force required for the attached instrument. The current and torque limiters ensure that the current and torque remain within the thresholds set for the instrument 40. Each instrument 40 may have its own current and torque limiters stored in a memory (not shown) which are provided to the IDU 52 through the electrical connector 220. The jaw clamp feedback loop maintains consistent clamp force while the jaws 120 and 122 of the instrument are closed.

Pretension on the cables 380a, 380b, 380c, 380d applies a torque to each of the couplers 310a, 310b, 310c, 310d of the attached instrument 50 by commanding a ramp trajectory to the target torque which may be from about 0.001 Nm to about 0.01 Nm. This is done to ensure a minimum torque is maintained. The current needed to achieve the minimum torque is latched at the completion of this step. This is done to maintain tension on the cables 380a, 380b, 380c, 380d. If the end time of the ramp trajectory, which may also include an additional offset time value (e.g., 5 ms), has elapsed before the terminal torque is detected, the IDU controller 52 transitions to an exception (i.e., outputting an error) indicating that the instrument 50 is not properly engaged with the IDU 52.

It will be understood that various modifications may be made to the embodiments disclosed herein. In embodiments, the sensors may be disposed on any suitable portion of the robotic arm. Therefore, the above description should not be construed as limiting, but merely as exemplifications of various embodiments. Those skilled in the art will envision other modifications within the scope and spirit of the claims appended thereto.

What is claimed is:

1. A surgical robotic arm comprising:
   an instrument including:
      a plurality of cables that are movable longitudinally; and
      an end effector movable by the cables; and
   a drive unit including:
      a plurality of motors each of which is configured to move one of the cables;
      a plurality of torque sensors, each of which is configured to measure torque output by one of the motors; and
      a controller configured to:
         receive a torque measurement from each of the torque sensors;
         control each of the motors to apply a minimum torque to maintain a minimum tension on each of the cables based on the torque measurement from each of the torque sensors; and
         adjust the minimum torque applied by each of the motors to maintain the minimum tension in a null space of the controller such that the minimum torque applied does not cause movement of the end effector.

2. The surgical robotic arm according to claim 1, wherein the controller is further configured to compare each of the torque measurements to determine a maximum torque value.

3. The surgical robotic arm according to claim 2, wherein the controller is further configured to perform a comparison of the maximum torque value to a threshold torque value.

4. The surgical robotic arm according to claim 3, wherein the controller is further configured to calculate a torque compensation value based on the comparison.

5. The surgical robotic arm according to claim 4, wherein the controller is further configured to adjust the minimum torque applied by each of the motors based on the torque compensation value.

6. A surgical robotic arm comprising:
   an instrument including:
      a plurality of cables that are movable longitudinally; and
      an end effector movable by the cables; and
   a drive unit including:
      a plurality of motors each of which is configured to move one of the cables; and
      a controller configured to control each of the motors in a dithering pattern within a null space of the controller such that dithering does not cause movement of the end effector to maintain the end effector in a dynamic friction region.

7. A surgical robotic arm according to claim 6, wherein the controller is further configured to:
   compare a desired position of the end effector with an actual position of the end effector; and
   calculate an error between the actual position and the desired position.

8. A surgical robotic arm according to claim 7, wherein the controller is further configured to determine desired displacement of each of the plurality of motors based on the error.

9. A surgical robotic arm according to claim 8, wherein the controller is further configured to control the plurality of motors to move the cables based on the desired displacement.

10. The surgical robotic arm according to claim 9, wherein the error is indicative of a nonlinearity of the cables.

11. The surgical robotic arm according to claim 10, wherein the nonlinearity is selected from the group consisting of backlash, cable stretch, and stiction.

12. The surgical robotic arm according to claim 11, wherein the instrument further includes a cable displacement sensor configured to measure the actual position of the end effector.

13. The surgical robotic arm according to claim 9, wherein the controller is further configured to:
   receive actual motor position feedback; and
   perform a comparison of the motor position feedback with the desired displacement.

14. The surgical robotic arm according to claim 13, wherein the controller is further configured to:
   calculate movement commands for the motors based on the comparison.

15. The surgical robotic arm according to claim 14, wherein the drive unit further includes:
   a plurality of encoders, each of which is coupled to one of the motors of the plurality of motors, each of the encoders is configured to measure displacement of each of the motors.

16. A method for controlling a surgical robotic instrument, the method comprising:
   coupling an instrument to a drive unit, the instrument including an end effector having a pair of jaw members movable by a plurality of cables, the drive unit having a plurality of motors each of which is configured to move one of the cables;
   measuring torque output by each of the motors by a plurality of torque sensors, each of which is coupled to one of the motors;
   control each of the motors to apply a minimum torque to maintain a minimum tension on each of the cables based on a torque measurement from each of the torque sensors; and
   adjusting the minimum torque applied by each of the motors to maintain the minimum tension in a null space of the controller such that the minimum torque applied does not cause movement of the end effector.

17. The method according to claim 16, further comprising:
   comparing each of the torque measurements to determine a maximum torque value.

18. The method according to claim 17, further comprising:
   performing a comparison of the maximum torque value to a threshold torque value.

19. The method according to claim 18, further comprising:
   calculating a torque compensation value based on the comparison.

20. The method according to claim 19, further comprising:
   adjusting the minimum torque applied by each of the motors based on the torque compensation value.

* * * * *